(12) United States Patent
Noumura et al.

(10) Patent No.: US 9,074,544 B2
(45) Date of Patent: Jul. 7, 2015

(54) CONTROL APPARATUS FOR VEHICLE

(75) Inventors: Shin Noumura, Susono (JP); Ken Koibuchi, Hadano (JP); Kaiji Itabashi, Gotenba (JP); Toshio Tanahashi, Susono (JP); Keisuke Takeuchi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 13/820,311

(22) PCT Filed: Sep. 12, 2011

(86) PCT No.: PCT/IB2011/002111
§ 371 (c)(1),
(2), (4) Date: Mar. 1, 2013

(87) PCT Pub. No.: WO2012/035398
PCT Pub. Date: Mar. 22, 2012

(65) Prior Publication Data
US 2013/0166101 A1    Jun. 27, 2013

(30) Foreign Application Priority Data

Sep. 13, 2010 (JP) ................................ 2010-204670

(51) Int. Cl.
| G05D 1/00 | (2006.01) |
| --- | --- |
| G05D 3/00 | (2006.01) |
| G06F 7/00 | (2006.01) |
| G06F 17/00 | (2006.01) |
| G06F 19/00 | (2011.01) |
| G06G 7/70 | (2006.01) |
| F02D 41/10 | (2006.01) |
| B60W 10/06 | (2006.01) |
| B60W 10/11 | (2012.01) |
| B60W 10/184 | (2012.01) |
| B60W 10/20 | (2006.01) |
| B60W 30/18 | (2012.01) |
| B60W 50/08 | (2012.01) |

(52) U.S. Cl.
CPC ................ *F02D 41/10* (2013.01); *G06F 17/00* (2013.01); *B60W 10/06* (2013.01); *B60W 10/11* (2013.01); *B60W 10/184* (2013.01); *B60W 10/20* (2013.01); *B60W 30/18109* (2013.01); *B60W 50/087* (2013.01); *B60W 2520/105* (2013.01); *B60W 2520/125* (2013.01); *B60W 2540/12* (2013.01)

(58) Field of Classification Search
USPC .......................................... 701/1, 36, 70, 110
See application file for complete search history.

(56) References Cited

U.S. PATENT DOCUMENTS

| 5,477,825 A | 12/1995 | Hattori et al. |
| 2002/0165658 A1 | 11/2002 | Ament |

(Continued)

FOREIGN PATENT DOCUMENTS

| EP | 1 691 060 A1 | 8/2006 |
| JP | 06-070406 | 3/1994 |

(Continued)

*Primary Examiner* — Imran Mustafa
(74) *Attorney, Agent, or Firm* — Oliff PLC

(57) ABSTRACT

In a vehicle control apparatus that changes the travel characteristic of a vehicle on the basis of a change of the acceleration of the vehicle, when the travel characteristic is to be changed because the acceleration has changed, the amount of change of the travel characteristic to be changed is adjusted on the basis of the pre-change travel characteristic that is present immediately prior to the change of the acceleration.

14 Claims, 9 Drawing Sheets

(56) References Cited

U.S. PATENT DOCUMENTS

| | | | |
|---|---|---|---|
| 2007/0106447 A1* | 5/2007 | Ogawa | 701/96 |
| 2007/0131468 A1* | 6/2007 | Bullinger et al. | 180/282 |
| 2007/0213176 A1 | 9/2007 | Fuji et al. | |
| 2009/0099727 A1* | 4/2009 | Ghoneim | 701/36 |
| 2009/0192692 A1* | 7/2009 | Hartmann et al. | 701/102 |
| 2012/0053789 A1 | 3/2012 | Noumura et al. | |
| 2012/0136506 A1 | 5/2012 | Takeuchi et al. | |

FOREIGN PATENT DOCUMENTS

| | | |
|---|---|---|
| JP | A-6-249007 | 9/1994 |
| JP | A-2007-131038 | 5/2007 |
| JP | A-2007-270825 | 10/2007 |
| JP | A-2009-227207 | 10/2009 |
| JP | A-2011-207463 | 10/2011 |
| JP | A-2011-207464 | 10/2011 |
| JP | A-2011-207466 | 10/2011 |
| JP | A-2012-46147 | 3/2012 |
| WO | WO 90/00121 A1 | 1/1990 |
| WO | WO 2007/028683 A1 | 3/2007 |
| WO | WO 2011/021084 A2 | 2/2011 |
| WO | WO 2011/021088 A1 | 2/2011 |
| WO | WO 2011/021089 A2 | 2/2011 |
| WO | WO 2011/021090 A2 | 2/2011 |
| WO | WO 2011/021634 A1 | 2/2011 |

* cited by examiner

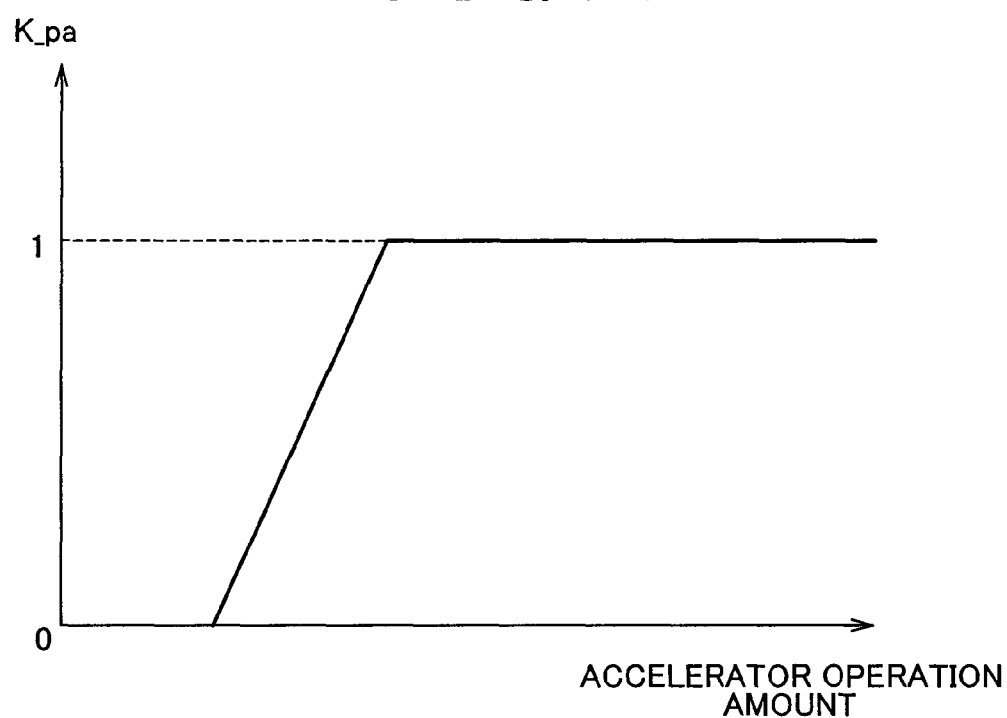
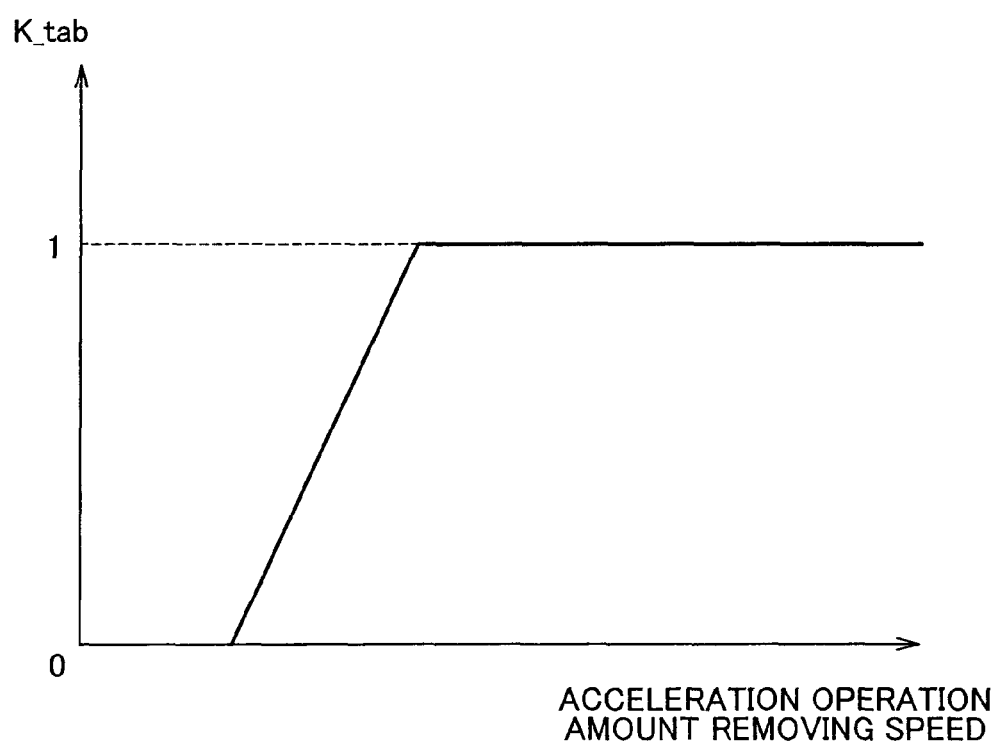

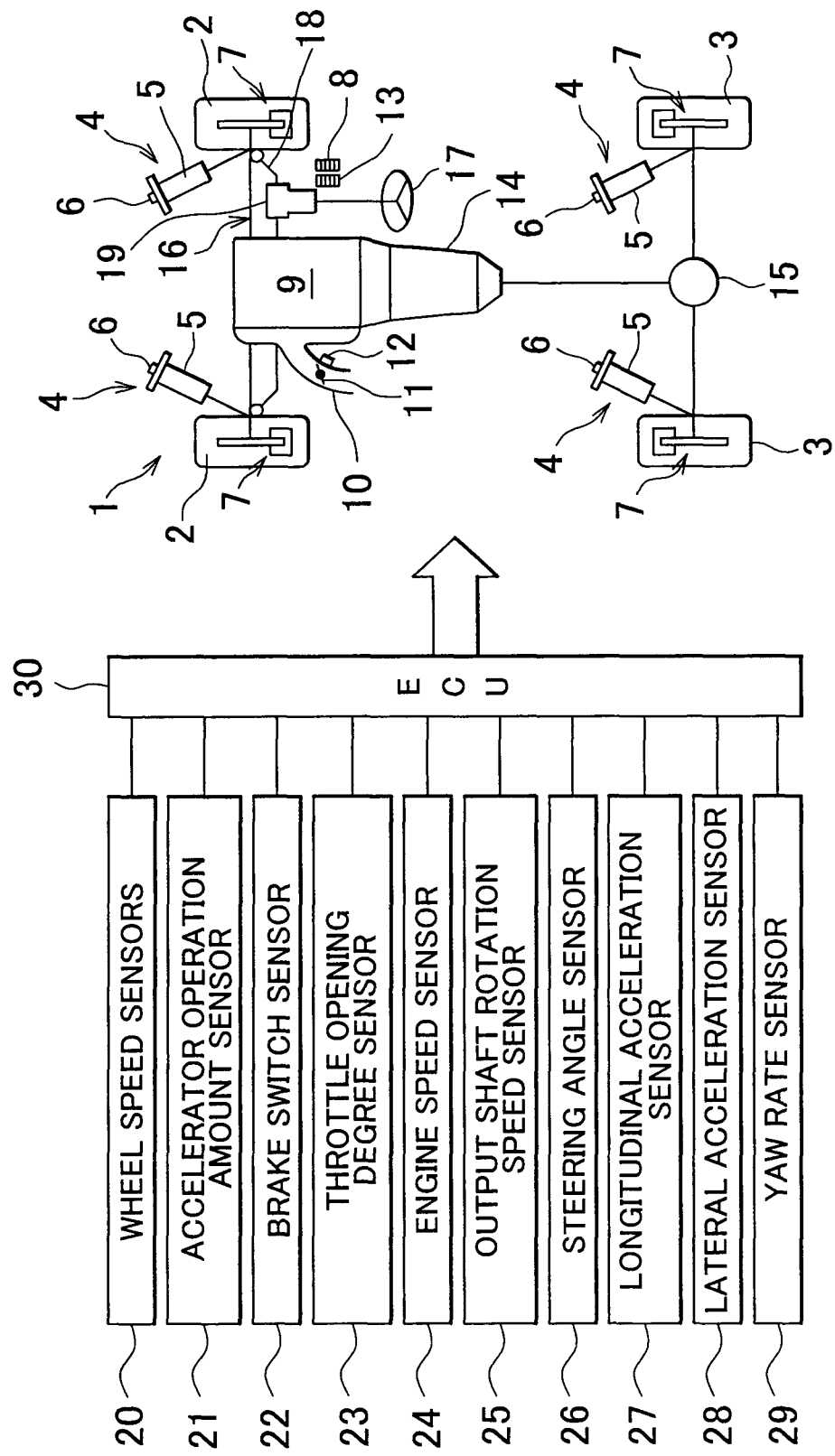

CONTROL APPARATUS FOR VEHICLE

BACKGROUND OF THE INVENTION

1. Field of the Invention

The invention relates to a control apparatus constructed so that the behavior characteristic or acceleration/deceleration characteristic of a vehicle (hereinafter, referred to as travel characteristic), such as the vehicle's motive power characteristic, the steering characteristic, the suspension characteristic, etc., will be caused to agree with the travel environment of the vehicle, the driver's preferences and the driver's intentions in driving, etc.

2. Description of Related Art

The behavior of a vehicle, such as the vehicle speed, the traveling direction, etc., changes as the driver of the vehicle performs an accelerating/decelerating operation or a steering operation. The relationship between the amount of such operation and the amount of change in the behavior of the vehicle is determined not only by energy efficiency, such as fuel economy and the like, but also by the ride comfort and the quietness that are demanded of the vehicles as well as the motive power performance and the like.

On another hand, the environments where vehicles travel vary, including urban areas, express highways, winding roads, uphill roads, downhill roads, etc., and the impressions that the vehicle drivers receive from the vehicles also vary depending on the drivers' likings (inclinations) and the types of the vehicles. Therefore, if the environment of travel of a vehicle or the driver of the vehicle changes, an expected travel characteristic is not always obtained, so that so-called drivability sometimes declines.

Therefore, there has been developed a vehicle that allows manual selection of a desired one of travel characteristics regarding the vehicle behavior that include the motive power characteristic (or acceleration characteristic), the suspension characteristic, etc., through a mode switching operation. For example, one of such vehicles allows selection, through a switch operation, of a desired one of a sports mode in which the acceleration characteristic is excellent and the suspension setting is made to a hard side to a certain degree, a normal mode in which a relatively slow acceleration characteristic is given and a comparatively soft suspension characteristic is made, and an economy mode in which priority is given to the fuel economy, among other modes.

Furthermore, various apparatuses for reflecting the driving inclinations of drivers in the behavior control of a vehicle have been proposed. According to such apparatuses, the switch operation is unnecessary, and minute or fine changes of the characteristic of the vehicle are possible. An example of such apparatuses is described in Japanese Patent Application Publication No. 06-249007 (JP-A-06-249007). The apparatus described in Japanese Patent Application Publication No. 06-249007 (JP-A-06-249007) is a drive force control apparatus that learns a relationship of the acceleration of the vehicle with the accelerator stroke and the vehicle speed as a demanded acceleration model, and that computes a throttle opening degree on the basis of a deviation of the model from a second reference acceleration model that reflects the driver's inclination regarding the driving, and a deviation between the second reference acceleration model and a first reference acceleration model that is a standard model.

The foregoing apparatus described in Japanese Patent Application Publication No. 06-249007 (JP-A-06-249007) changes the settings for the driver's inclination about the driving or the vehicle's travel characteristic on the basis of the longitudinal acceleration of the vehicle or on the basis of the driver's operation of the accelerator pedal. Therefore, the driver's inclination about the driving can be estimated by detecting or estimating the behavior of the acceleration of the vehicle, and then can be reflected in the control of the vehicle behavior. However, there are still present rooms for improvement in order to reflect the environment of travel of a vehicle and the driver's preference and also intentions in the driving more accurately in the control of the vehicle behavior.

SUMMARY OF THE INVENTION

This invention provides a control apparatus for a vehicle which is capable of improving the degree of satisfaction of a driver of the vehicle and the drivability of the vehicle by more precisely reflecting the environment of travel of the vehicle, the preference of the driver and the driver's intention in driving in the characteristic of the control of the behavior of the vehicle.

A first aspect of the invention relates to a vehicle control apparatus that changes a travel characteristic of a vehicle based on a change in acceleration of the vehicle. The control apparatus includes a controller that adjusts an amount of change of the travel characteristic based on a pre-change travel characteristic present immediately prior to the change in the acceleration, if the travel characteristics is to be changed due to the change of the acceleration. For example, if the driver performs a driving operation for an emergency braking in the case where the driver does not want a sporty travel characteristic, the controller may restrain or prohibit the changing to a sportier travel characteristic.

With this construction, the travel characteristic of the vehicle that includes, for example, the motive power characteristic, the steering characteristic, the suspension characteristic, etc., is changed on the basis of the acceleration that has occurred on the vehicle, or the acceleration that is predicted to occur on the vehicle. The travel characteristic of the vehicle is changed and set according to, for example, a change in the longitudinal acceleration of the vehicle in association with the accelerator operation, a change in the deceleration in the longitudinal direction of the vehicle in association with the brake operation, a change in the lateral acceleration of the vehicle in association with the steering operation, etc. Specifically, contents of operations performed by the driver which cause acceleration on the vehicle, such as the accelerator operation, the brake operation, the steering operation, etc., that is, the driver's intentions in driving, are reflected in the setting of the travel characteristic of the vehicle. Therefore, the travel characteristic of the vehicle can be made to precisely reflect the actual behavior of the vehicle, the driver's intentions, habits, etc. Then, when the travel characteristic of the vehicle is to be changed because the acceleration changes as described above, the amount of change for the newly set post-change travel characteristic is adjusted according to the travel characteristic of the vehicle immediately prior to the change of the acceleration, that is, the pre-change travel characteristic present immediately before the acceleration changes. For example, in the case where the pre-change travel characteristic is set suitable for a so-called sports driving that allows quick operation response, the amount of change of the travel characteristic of the vehicle is adjusted in changing the travel characteristic so that a travel characteristic more suitable to the sports driving will be set. On the other hand, in the case where the pre-change travel characteristic is set for a normal driving that is other than the so-called sports driving, the amount of change is adjusted in changing the travel characteristic of the vehicle so that the travel characteristic of the vehicle will not be set suitable a level of sports driving that the driver does not intend, or alternatively the change is prohibited. Therefore, in the case where a change occurs in the acceleration of the vehicle during a travel and the control of changing the travel characteristic of the vehicle is executed, it is possible to execute an appropriate control that follows the driver's intention in driving, so that the degree of satisfaction of the driver and the drivability of the vehicle can be improved.

In the control apparatus described above, if the travel characteristic is to be changed because the change of the acceleration is caused by a braking operation performed by a driver, the controller may restrain the amount of change of the travel characteristic based on the pre-change travel characteristic present immediately before the braking operation is started.

With this construction, when a braking operation is performed during a travel of the vehicle and the acceleration (deceleration) of the vehicle changes so that the travel characteristic of the vehicle is to be changed, the amount of change for the newly set post-change travel characteristic is restrained according to the pre-change travel characteristic present immediately before the braking operation is started. The braking operation that is a factor for changing the acceleration of the vehicle includes a quick braking operation performed during the so-called sports driving and an emergency braking operation for avoiding a danger. For example, in the case where an emergency braking as mentioned above is performed during a normal travel during which the pre-change travel characteristic is not of the so-called sports driving, the amount of change for the newly set post-change travel characteristic is restrained, so as to avoid an event in which despite the driver's intention in driving, the post-change travel characteristic is set for a level of sporty characteristic that the driver does not intend. Therefore, the actual behavior of the vehicle and the driver's preferences and the driver's intensions in driving, etc. can be precisely reflected in the setting of the travel characteristic of the vehicle.

In the control apparatus, if the travel characteristic is to be changed because the change of the acceleration is caused by the braking operation performed by the driver, the controller may restrain the amount of change of the travel characteristic according to a content of an accelerating operation performed by the driver immediately before the braking operation is started.

With this construction, when a braking operation is performed during a travel of the vehicle and the acceleration (deceleration) of the vehicle changes so that the travel characteristic of the vehicle is to be changed, the amount of change for the newly set post-change travel characteristic is restrained according to the content of the accelerating operation performed by the driver immediately before the braking operation is started. The content of the accelerating operation performed by the driver includes, for example, the amount of depression of the accelerator pedal or the accelerator operation amount, the speed at which the accelerator pedal is released (returned), the pedal switch time that is taken to switch from the accelerator pedal to the brake pedal. Therefore, when a braking operation is performed during a travel, the travel characteristic of the vehicle immediately before the braking operation is started is determined or estimated on the basis of the content of the accelerating operation. Then, on the basis of the determined or estimated travel characteristic, the amount of change for the newly set post-change travel characteristic is appropriately restrained, and the post-change travel characteristic is accordingly set. Therefore, the actual behavior of the vehicle and the driver's preferences and the driver's intensions in driving, etc. can be precisely reflected in the setting of the travel characteristic of the vehicle.

In the vehicle control apparatus, if the travel characteristic is to be changed because the change of the acceleration is caused by the braking operation performed by the driver, the controller may restrain the amount of change of the travel characteristic based on an output rotation speed of a drive force source of the vehicle occurring immediately before the braking operation is started.

With this construction, when a braking operation is performed during a travel of the vehicle and the acceleration (deceleration) of the vehicle changes so that the travel characteristic of the vehicle is to be changed, the amount of change for the newly set post-change travel characteristic is restrained according to the output rotation speed of the drive force source occurring immediately before the braking operation is started. Therefore, in the case where a braking operation is performed during a travel of the vehicle, the travel characteristic present immediately before the braking operation is started is determined or estimated on the basis of the output rotation speed of the drive force source. Then, on the basis of the determined or estimated travel characteristic, the amount of change for the newly set post-change travel characteristic is appropriately restrained, and the post-change travel characteristic is accordingly set. Therefore, the actual behavior of the vehicle and the driver's preferences and the driver's intensions in driving, etc. can be precisely reflected in the setting of the travel characteristic of the vehicle.

In the vehicle control apparatus, if the travel characteristic is to be changed because the change of the acceleration is caused by the braking operation performed by the driver, the controller may restrain the amount of change of the travel characteristic based on a speed change ratio present in a transmission of the vehicle immediately before the braking operation is started.

With this construction, when a braking operation is performed during a travel of the vehicle and the acceleration (deceleration) of the vehicle changes so that the travel characteristic of the vehicle is to be changed, the amount of change for the newly set post-change travel characteristic is restrained according to the speed change ratio (i.e., the speed change step, or the gear ratio) of the transmission present immediately before the braking operation is started. Therefore, in the case where a braking operation is performed during a travel of the vehicle, the travel characteristic present immediately before the braking operation is started is determined or estimated on the basis of the speed change ratio of the transmission. Then, on the basis of the determined or estimated speed change ratio, the amount of change for the newly set post-change travel characteristic is appropriately restrained, and the post-change travel characteristic is accordingly set. Therefore, the actual behavior of the vehicle and the driver's preferences and the driver's intensions in driving, etc. can be precisely reflected in the setting of the travel characteristic of the vehicle.

In the vehicle control apparatus, the controller may find an index based on the acceleration, and the controller may change the travel characteristic by changing the index, and may restrain the amount of change of the travel characteristic by restraining the amount of change of the index. In the invention, the term "restraining the amount of change of the index" includes the meaning of not changing the index.

With this construction, the acceleration is substituted with the index, and on the basis of the index, the control of changing or maintaining the travel characteristic is performed. Therefore, besides the foregoing effects, the diversity or the degree of freedom in the control can be improved.

The index may include an index that is found based on a resultant acceleration composed of a longitudinal acceleration component in a longitudinal direction of the vehicle and a lateral acceleration component in a direction of an axle shaft of the vehicle.

With this construction, the index for setting the travel characteristic of the vehicle can be found on the basis of the acceleration of the vehicle. In other words, the index for setting the travel characteristic of the vehicle is changed on the basis of the acceleration that has occurred on the vehicle or the acceleration that is predicted to occur on the vehicle. The acceleration is an acceleration composed of the longitudinal acceleration component in the longitudinal direction of the vehicle and the lateral acceleration component in the direction of the axle shaft (the lateral direction) of the vehicle, and is not limited to the resultant acceleration composed of both the longitudinal acceleration and the lateral acceleration of the vehicle, but may be merely the longitudinal acceleration or may also be the lateral acceleration. Therefore, for example, in the case where the longitudinal acceleration in the accelerating direction associated with an accelerator operation is great, or the case where the longitudinal acceleration in the decelerating direction caused by a brake operation is great, or the case where the lateral acceleration is great because the steering angle is great or because the vehicle speed at the time of steering is fast, the travel characteristic is set so as to allow quick behaviors. Besides, the contents of driving operation performed by the driver which cause acceleration on the vehicle, such as the accelerator operation, the brake operation or the steering operation, etc., may be reflected in the changing or setting of the index. Therefore, the contents of driving operations performed by the driver, that is, the driver's intentions in driving in relation to the state of travel of the vehicle, are well reflected in the travel characteristic of the vehicle, so that the travel characteristic of the vehicle becomes as expected or predicted by the driver and therefore the drivability can be improved.

The index may include an index that is found by causing a degree of change of the travel characteristic based on the change of the longitudinal acceleration component in an accelerating direction to be greater than the degree of change of the travel characteristic based on the change of the longitudinal acceleration component in a decelerating direction.

With this construction, the degree of change of the travel characteristic of the vehicle that is changed on the basis of the change of the longitudinal acceleration component in the accelerating direction, among the accelerations that serve as a basis for finding indexes that represent the state of travel of the vehicle, is made greater than the degree of change of the travel characteristic of the vehicle that is changed on the basis of the change of the longitudinal acceleration component in the decelerating direction. For example, the longitudinal acceleration component in the accelerating direction is more greatly weighted than the longitudinal acceleration component in the decelerating direction, in order to find the index. As for the longitudinal acceleration of the vehicle, the acceleration component in the decelerating direction usually more readily occurs than the acceleration component in the accelerating direction, and the acceleration component in the decelerating direction is usually higher in control response. Therefore, if the index is found by weighting the longitudinal acceleration component in the accelerating direction among the acceleration components in the accelerating and decelerating directions as described above, the index can be precisely and accurately set according to differences in characteristic between the acceleration component in the accelerating direction and the acceleration component in the decelerating direction.

The index may include an index that is found by causing a degree of change of the travel characteristic that is based on the change of the longitudinal acceleration component to be greater than the degree of change of the travel characteristic that is based on the change of the lateral acceleration component.

With this construction, the degree of change of the travel characteristic of the vehicle that is changed on the basis of the change of the longitudinal acceleration component, among the accelerations that serve as a basis for finding indexes that represent the state of travel of the vehicle, is made greater than the degree of change of the travel characteristic of the vehicle that is changed on the basis of the change of the lateral acceleration component. For example, the longitudinal acceleration component is more greatly weighted than the lateral acceleration component, in order to find the index. As for the longitudinal acceleration of the vehicle, the lateral acceleration component usually more readily occurs than the longitudinal acceleration component, and the lateral acceleration component is usually higher in control response. Therefore, if the index is found by weighting the longitudinal acceleration component as described above, the index can be accurately and precisely set according to differences in characteristic between the longitudinal acceleration component and the lateral acceleration component.

According to the invention, during a normal driving that is other than a sports driving, increase in the sports index is restrained (the amount of change of the travel characteristic is adjusted according to the pre-change travel characteristic present immediately prior to the change of the acceleration). Therefore, for example, when a quick brake operation is performed during a normal driving, the sports index is low after the quick brake operation is performed, because the sports index is low before the quick brake operation is performed. Accordingly, the sports index is not set at a value that corresponds to a level of sports driving which is apart from the driver's intention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a diagram showing an example of a map for use in the computation of a gain regarding the accelerator operation amount in the control shown by the flowchart in FIG. 2;

FIG. 5 is a diagram showing an example of a map for use in the computation of a gain regarding the accelerator operation amount removing speed in the control shown by the flowchart in FIG. 2;

FIG. 12 is a diagram schematically showing a vehicle to which the invention is applicable.

DETAILED DESCRIPTION OF EMBODIMENTS

Figure 1:
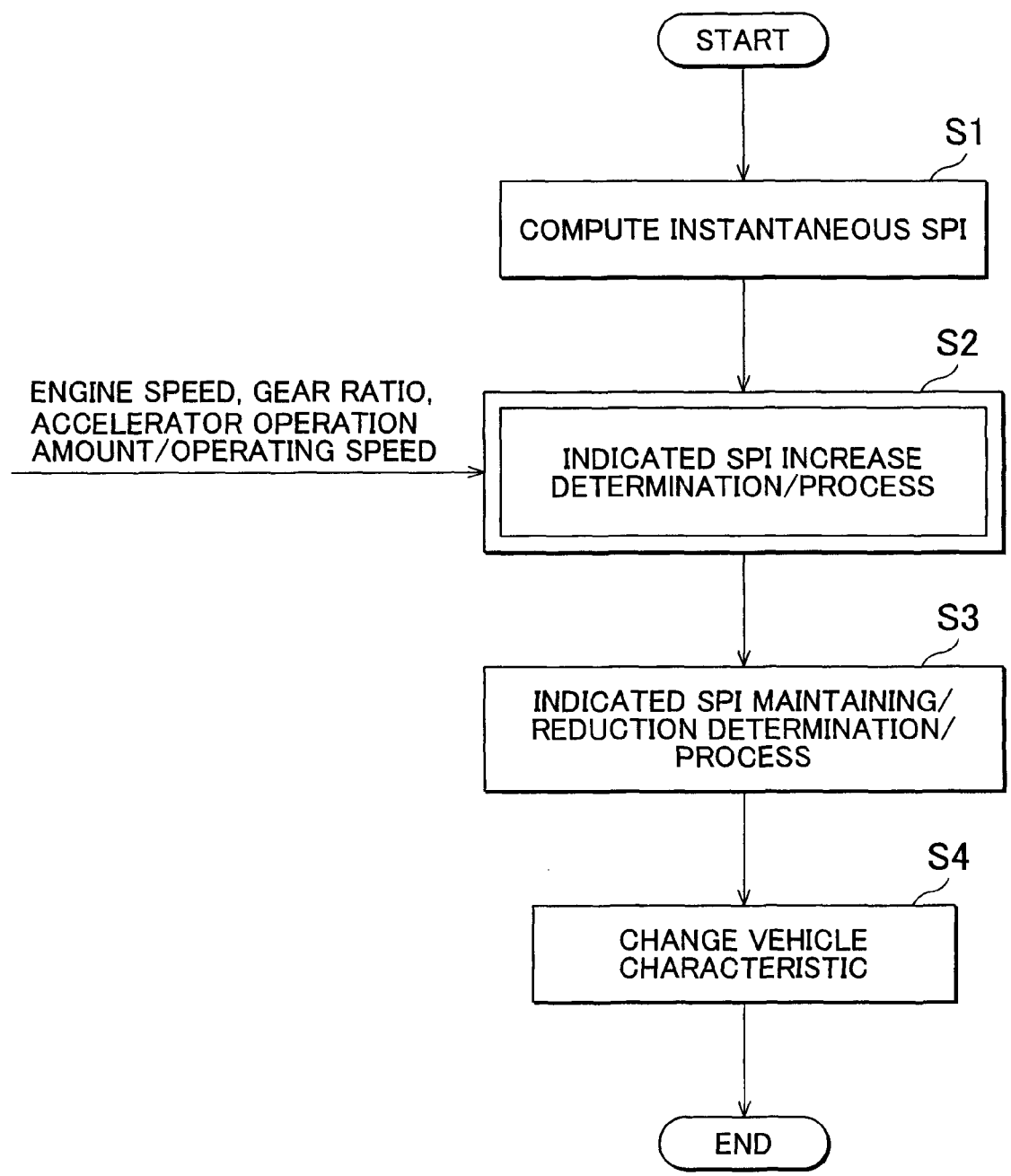
FIG. 1 is a flowchart conceptually showing an example of a control that is executed by a control apparatus in accordance with an embodiment of the invention.

A control apparatus that is an embodiment of the invention finds an index on the basis of the state of travel of a vehicle, and changes the travel characteristic of the vehicle according to the index. The state of travel includes, for example, a vehicle travel operation amount, such as an accelerator operation amount, a brake operation amount, a steering wheel operation amount, etc., a longitudinal and lateral accelerations, a resultant acceleration composed of the longitudinal and lateral accelerations, the degree of yawing, the yaw rate, etc. Among these amounts, the acceleration is not limited to the longitudinal acceleration, but may also include the lateral acceleration. More concretely, the resultant acceleration composed of the longitudinal acceleration and the lateral acceleration can be adopted. Due to this, not only the behavior of the vehicle caused by the accelerator operation or the brake operation, but also the behavior caused by steering can be favorably reflected in the travel characteristic of the vehicle. Incidentally, the foregoing acceleration may be so-called actual acceleration that is detected by a sensor, or may also be acceleration that is estimated on the basis of the accelerator operation amount and the brake operation amount. The foregoing travel characteristic of the vehicle is a characteristic regarding the behavior of the vehicle, such as the motive power characteristic, the acceleration characteristic or the braking characteristic of the vehicle, or the turning-round characteristic (or turning performance) based on steering, or the suspension characteristic (support characteristic or damper characteristic) of the vehicle body based on the suspension mechanism.

In this embodiment, the aforementioned acceleration is reflected in the index, and the index represents the driver's liking or the driver's inclination in driving which appears as acceleration, that is, shows the so-called sports index (or degree). Therefore, the index, although based on the acceleration, does not change in association with the acceleration. Besides, since the index changes with changes in the acceleration, the index usually assumes large values when the acceleration (including absolute value of acceleration) is large, and assumes small values when the acceleration is small.

The control apparatus changes the index according to, besides the foregoing acceleration, the content of an operation performed by the driver for the travel of the vehicle, and therefore changes the travel characteristic of the vehicle. The foregoing operation is, in short, an operation that leads to a change in the acceleration that acts on the vehicle, for example, the accelerator operation that changes the amount of depression of the accelerator pedal so as to change the output of a drive force source, such as an engine or the like, or change the speed change ratio of the transmission, the brake operation that changes the braking force, the steering operation that changes the amount of turn of the vehicle, etc. Then, the content of the operation is, for example, the amount of operation or the rate or speed of operation.

Next, this embodiment of the invention will be more concretely described. Firstly, the vehicle to which the embodiment can be applied is a vehicle that accelerates or turns due to a driver's operation, and a typical example of the vehicle to which the embodiment is applicable is a motor vehicle that uses an internal combustion engine or an electric motor as a drive force source. A vehicle 1 in accordance with an embodiment of the invention is shown in a block diagram in FIG. 12. The vehicle 1 has four wheels, that is, two front wheels 2 that are steer road wheels, and two rear wheels 3 that are drive wheels. Each of the four wheels 2 and 3 is attached to the vehicle body (not shown) by a suspension apparatus 4. Each suspension apparatus 4 is constructed mainly of a spring and a shock absorber (damper) as is the case with a generally known suspension. FIG. 12 shows a shock absorber 5 of each suspension apparatus 4. The shock absorber 5 shown herein causes a cushioning effect by utilizing the flow resistance of a fluid such as a gas, a liquid, etc., and the magnitude of the flow resistance is changed by an actuator such as an electric motor 6. Specifically, when the flow resistance is made large, the vehicle body does not easily sink, producing a so-called hard feel, and the behavior of the vehicle 1 decreases in comfort feel, and increases in sporty feel. Incidentally, the suspension apparatuses 4 can be constructed so that a pressurized gas is supplied into and discharged from the shock absorbers 5 so as to adjust the vehicle height.

The front and rear wheels 2 and 3 are each provided with a brake apparatus 7. For example, by depressing a brake pedal 8 disposed at a driver's seat-side, the brake apparatuses 7 are engaged to give braking forces to the front and rear wheels 2 and 3.

The drive force source of the vehicle 1 is a commonly known drive force source, such as an internal combustion engine, an electric motor, or a mechanism in which an internal combustion engine and an electric motor are combined, etc. FIG. 12 shows an example in which an internal combustion engine 9 is mounted. An intake pipe 10 of the engine 9 is provided with a throttle valve 11 for controlling the amount of intake air. This throttle valve 11 is an electronic throttle valve. The opening and closing actions of the throttle valve 11 are carried out so as to adjust the degree of opening of the valve, by an actuator 12 that is electrically controlled, such an electric motor or the like. The actuator 12 adjusts the throttle valve 11 to a predetermined opening degree (throttle opening degree) by operating according to the amount of depression of an accelerator pedal 13 that is disposed at the driver's seat-side, that is, the accelerator operation amount.

The relationship between the accelerator operation amount and the throttle opening degree can be set as appropriate. The closer to a one-to-one ratio the relation between the accelerator operation amount and the throttle opening degree, the stronger the so-called direct feel becomes, and the sportier in feel the travel characteristic of the vehicle 1 becomes. If a setting is made such that the throttle opening degree becomes relatively small relative to an accelerator operation amount, the travel characteristic of the vehicle 1 changes into a so-called mild feel. Incidentally, in the case where an electric motor is used as a drive force source, an electric controller, such as an inverter, a converter or the like, is provided instead of the throttle valve 11. Then, the current controller is used to adjust the electric current that flows through the electric motor according to the accelerator operation amount, and the relationship of the value of current to the accelerator operation amount, that is, the vehicle travel characteristic, is appropriately changed.

A transmission 14 is linked to an output side of the engine 9. The transmission 14 appropriately changes the ratio between the input rotation speed and the output rotation speed, that is, the speed change ratio. The transmission 14 is, for example, a commonly known a step type automatic transmission, a belt type continuously variable transmission, or a toroidal type continuously variable transmission, etc. Therefore, the transmission 14 has an actuator (not shown), and appropriately controls the actuator so as to change the speed change ratio stepwise or continuously. Incidentally, in the ratio shift control, a ratio shift map in which the speed change ratio is determined in correspondence to the state of the vehicle 1, such as the vehicle speed, the accelerator operation amount, etc., is prepared beforehand, and the shift control is executed according to the shift map, or a target output is calculated on the basis of the state of the vehicle 1, such as the vehicle speed, the accelerator operation amount, etc. A target engine rotation speed is found from the target output and an optimum fuel economy line, and the ratio shift control is executed so that the target engine rotation speed is achieved.

In the ratio shift control as described above, a fuel economy-priority control, or a control for increasing the drive force can be selected. The control of giving priority to the fuel economy is a control in which the upshift is executed at a relatively low vehicle speed or a control in which a relatively high speed-side speed change ratio is used at a low vehicle speed side. The control of improving the drive force or the acceleration characteristic is a control in which the upshift is executed at a relatively high vehicle speed or a control in which a relatively low speed-side speed change ratio is used at a high vehicle speed side. Such controls can be performed by switching shift maps, or correcting the demanded drive amount, or correcting the calculated speed change ratio. Incidentally, a drive transmission mechanism, such as a lockup clutch-equipped torque converter or the like, can be provided between the engine 9 and the transmission 14 according to need. An output shaft of the transmission 14 is linked to the rear wheels 3 via a differential gear 15 that is a final speed reducer.

A steering mechanism 16 that steers the front wheels 2 will be described. A steering linkage 18 that transmits the turning motion of a steering wheel 17 to the left and right front wheels 2 is provided, and a an assist mechanism 19 that assists in the steering angle or the steering force of the steering wheel 17 is provided. The assist mechanism 19 is equipped with an actuator (not shown), and is able to appropriately adjust the amount of assist provided by the actuator.

Incidentally, although not particularly shown, the vehicle 1 is provided with a system for stabilizing the behavior or posture of the vehicle 1, such as an antilock braking system (ABS), a traction control system, a vehicle stability control system (VSC) that integrally controls the antilock braking system and the traction control system, etc. These systems are commonly known systems, and are constructed so that the locking and slipping of the wheels 2 and 3 is prevented or restrained and therefore the behavior of the vehicle 1 is stabilized by reducing the braking force on the wheels 2 and 3 or giving a braking force thereto on the basis of the deviation between the vehicle body speed and the wheel speed, or controlling the engine torque in combination with the foregoing braking force control. Besides, the vehicle 1 may also be provided with a navigation system capable of obtaining data regarding the traveling road or the road that the vehicle 1 will travel (i.e., the environment of travel of the vehicle), a switch for manually selecting a vehicle travel mode from a sports mode, a normal mode, a low-fuel-consumption mode (eco mode), etc., and may also be provided with a four-wheel drive mechanism (4WD) capable of changing the vehicle traveling characteristic such as the hill climb performance, the acceleration performance, the turning-round characteristic, etc.

The vehicle 1 is provided with various sensors that acquire data for use for controlling the foregoing engine 9, the transmission 14, the shock absorbers 5 of the suspension apparatuses 4, the assist mechanism 19, the above-described systems (not shown), etc. Examples of the sensors include wheel speed sensors 20 that detect rotation speeds of the front and rear wheels 2 and 3, an accelerator operation amount sensor 21 that detects the amount of depression of the accelerator pedal 13 (or the angle of depression thereof), a brake switch sensor 22 that detects the amount of depression (or angle of depression) of the brake pedal 8, that is, the state of operation of brake apparatuses 7, a throttle opening degree sensor 23 that detects the degree of opening of the throttle valve 11, an engine rotation speed sensor 24 that detects the output rotation speed of the drive force source, that is, the engine 9, an output shaft rotation speed sensor 25 that detects the rotation speed of the output shaft of the transmission 14, a steering angle sensor 26 that detects the steering angle (or steering amount) of the steering mechanism 16, a longitudinal acceleration sensor 27 that detects the longitudinal acceleration (Gx) of the vehicle 1, a lateral acceleration sensor 28 that detects the acceleration of the vehicle 1 in the lateral (left-right direction) (lateral acceleration Gy), a yaw rate sensor 29 that detects the yaw rate of the vehicle 1, among other sensors. Incidentally, the acceleration sensors 27 and 28 may also be used as acceleration sensors for the vehicle behavior controls of the antilock braking system (ABS), the vehicle stability control system (VSC), etc. In a vehicle in which airbags are amounted, the acceleration sensors 27 and 28 may also be used as acceleration sensors for the control of deployment of the airbags. Furthermore, the acceleration Gx and Gy in the longitudinal and lateral directions may also be acquired by detecting values of acceleration through the use of acceleration sensors that are disposed at predetermined inclined angle (e.g., 45°) to the longitudinal direction of the vehicle 1 in a horizontal plane and then dividing the detected values of acceleration into longitudinal acceleration components and lateral acceleration components. Besides, the longitudinal and lateral accelerations Gx and Gy may also be found by computations based on the accelerator operation amount, the vehicle speed, the road load, the steering angle, etc., instead of detection by the acceleration sensors. The various sensors 20 to 29 transfer detection signals (data) to an electronic control unit (ECU) 30. The electronic control unit 30 performs computations in accordance with the data from the sensors as well as data and programs that are stored therein beforehand, and outputs results of the computations as control command signals to the foregoing systems or the actuators thereof. Incidentally, the resultant or composed acceleration is not limited to an acceleration that includes acceleration components in a plurality of directions of the vehicle 1 that include an acceleration component in the longitudinal direction of the vehicle 1 and an acceleration component in the vehicle width direction (lateral direction) and the like, but may also be an acceleration in only one direction, for example, only in the longitudinal direction of the vehicle.

The control apparatus of the embodiment is constructed so as to reflect the environment of travel of the vehicle, the preference of the driver and the driver's intention in driving in the behavior control of the vehicle 1 (travel characteristic thereof) on the basis of the state of travel of the vehicle 1. The state of travel of the vehicle 1 means a state that is represented by the longitudinal acceleration, the lateral acceleration or the acceleration in yawing or rolling, or by an acceleration composed of two or more of the accelerations in different directions. That is, if it is taken into account that acceleration usually occurs on the vehicle 1 in a plurality of directions as the vehicle 1 is driven at a targeted speed or in a targeted direction or when the behavior of the vehicle 1 is returned to a previous state because of influence from the environment of travel of the vehicle, such as the road surface and the like, it is considered that the state of travel of the vehicle 1 reflects the environment of travel of the vehicle and the driver's inclination in driving to certain degrees. On the basis of such a background situation, the control apparatus is constructed so as to reflect the environment of travel of the vehicle, the preference of the driver and the driver's intention in driving in the behavior control of the vehicle 1 on the basis of the state of travel of the vehicle 1.

As described above, the behavior of the vehicle 1 includes the acceleration characteristic, the turning-round characteristic (turning characteristic), the support characteristic caused by the suspension apparatus 4 (i.e., the degree of bump-rebound or the likelihood of occurrence thereof), the degree of rolling or pitching, etc. In the control apparatus, the state of travel is included as one of the factors that change the foregoing travel characteristics of the vehicle. In that case, the acceleration in one of the foregoing directions or the value of a resultant or composed acceleration, that are examples of the foregoing states of travel of the vehicle, may be directly used to change the vehicle's travel characteristic. Furthermore, an index obtained by correcting such a value may also be used.

As an example of such an index, the sports index (SPI) will be described. The sports index is an index that shows a driver's intention or the state of travel of the vehicle 1. The sports index that can be adopted by the control apparatus is an index that is obtained by combining accelerations in different directions (particularly, the absolute values thereof). An example of such an index is an acceleration that is composed of the longitudinal acceleration Gx and the lateral acceleration Gy as accelerations that has considerably strong relations with the behavior of the vehicle in the traveling direction. For example, the adoptable sports index is calculated as an instantaneous sports index $Iin=(Gx^2+Gy^2)^{1/2}$. It is to be noted herein that the acceleration is not limited to an acceleration detected by a sensor, but may also be an acceleration that is calculated or estimated on the basis of the operation performed by the driver, such as the accelerator operation amount, the steering angle, the brake depression force, the amount of depression of the brake pedal 8, etc. Besides, the "instantaneous sports index Iin" means an index that is calculated on the basis of the acceleration found in each one of various directions at every instant during the traveling of the vehicle 1, and is a so-called physical quantity. Incidentally, "at every instant" means every time of repetition of the detection of accelerations and the calculation of the instantaneous sports index Iin based on the detected accelerations which are repeated in a predetermined cycle time.

Besides, of the longitudinal accelerations Gx for use in the foregoing computing equations, at least one of the accelerating-side acceleration or the decelerating-side acceleration (i.e., deceleration) may have been subjected to a normalizing process, or a weighting process. Specifically, in the case of common vehicles, the decelerating-side acceleration is greater than the accelerating-side acceleration, but this difference is hardly perceived or recognized by the drivers, that is, in many cases, drivers consider that acceleration occurs equally in the accelerating-side and the decelerating-side. The normalizing process is a process for correcting the difference between an actual value and the driver's perception. For example, for the longitudinal acceleration Gx, the normalizing process is a process of enlarging the acceleration in the accelerating side, or lessening the acceleration in the decelerating side (i.e., the deceleration). More concretely, the normalizing process for the longitudinal acceleration Gx is a process of finding a proportion of a maximum value of the acceleration in each side, and multiplying the accelerating-side or decelerating-side acceleration by the found proportion. Furthermore, the process performed herein may also be a weighting process of correcting the decelerating-side acceleration in relation to the lateral acceleration. In short, the weighting process is a process of performing a correction, such as the weighting of at least one of the forward and rearward maximum accelerations so that the maximum accelerations in the forward and rearward directions are positioned on the circumference of a circle of a predetermined radius, as in the case where the forward and rearward drive forces and the lateral force are expressed by a tire friction circle. Therefore, due to the normalizing process and the weighting process performed as described above, the accelerating-side acceleration and the decelerating-side acceleration are reflected in the vehicle's travel characteristic to mutually different degrees of reflection. Therefore, as an example of the weighting process, it is permissible to perform a weighting or normalizing process of the accelerations in the forward and rearward decelerating directions and the acceleration in the forward and rearward accelerating directions so that the degree of influence of the accelerations in the accelerating directions becomes great relative to the degree of influence of the accelerations in the decelerating directions. Incidentally, since the lateral acceleration is sometimes greater than the accelerating-side acceleration, the lateral acceleration may also be subjected to a weighting or normalizing process.

Thus, the actual values of acceleration and the driver's perceptions differ depending on the directions of acceleration. For example, such difference is considered to be present between the accelerations in the yawing directions and the rolling directions and the acceleration in the longitudinal directions. Therefore, in the control apparatus, the degrees of reflection of the accelerations in different directions in the vehicle's travel characteristic may be varied, that is, the degree of change in the vehicle's travel characteristic based on the acceleration in one of the directions may be made different from the degree of change in the vehicle's travel characteristic based on the acceleration in another direction.

Figure 9:
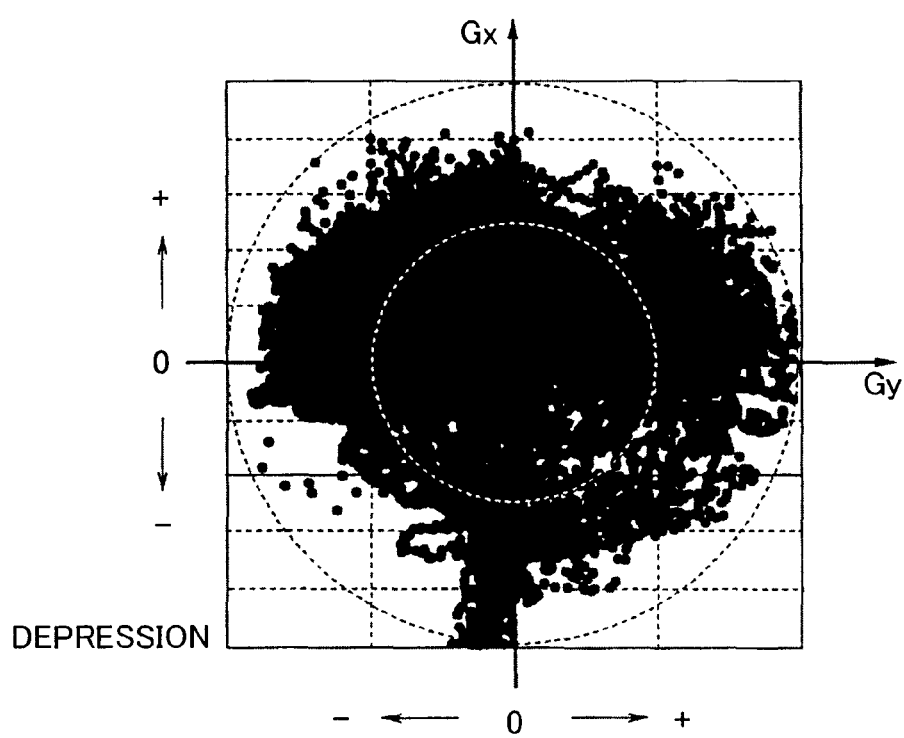
FIG. 9 is a diagram showing the plotting of detected values of the longitudinal acceleration and the lateral acceleration on a tire friction circle.

An example of the plotting, on a tire friction circle, of the sensor-detected values of the lateral acceleration Gy and the longitudinal acceleration Gx subjected to the foregoing normalizing process and the foregoing weighting process is shown in FIG. 9. This is an example of the plotting obtained in the case where a vehicle traveling through a test course that simulates an ordinary road. From FIG. 9, it can be seen that great lateral accelerations Gy highly frequently occur when the vehicle greatly decelerates, and there is a general tendency for the longitudinal acceleration Gx and the lateral acceleration Gy to occur along the tire friction circle.

Figure 10:
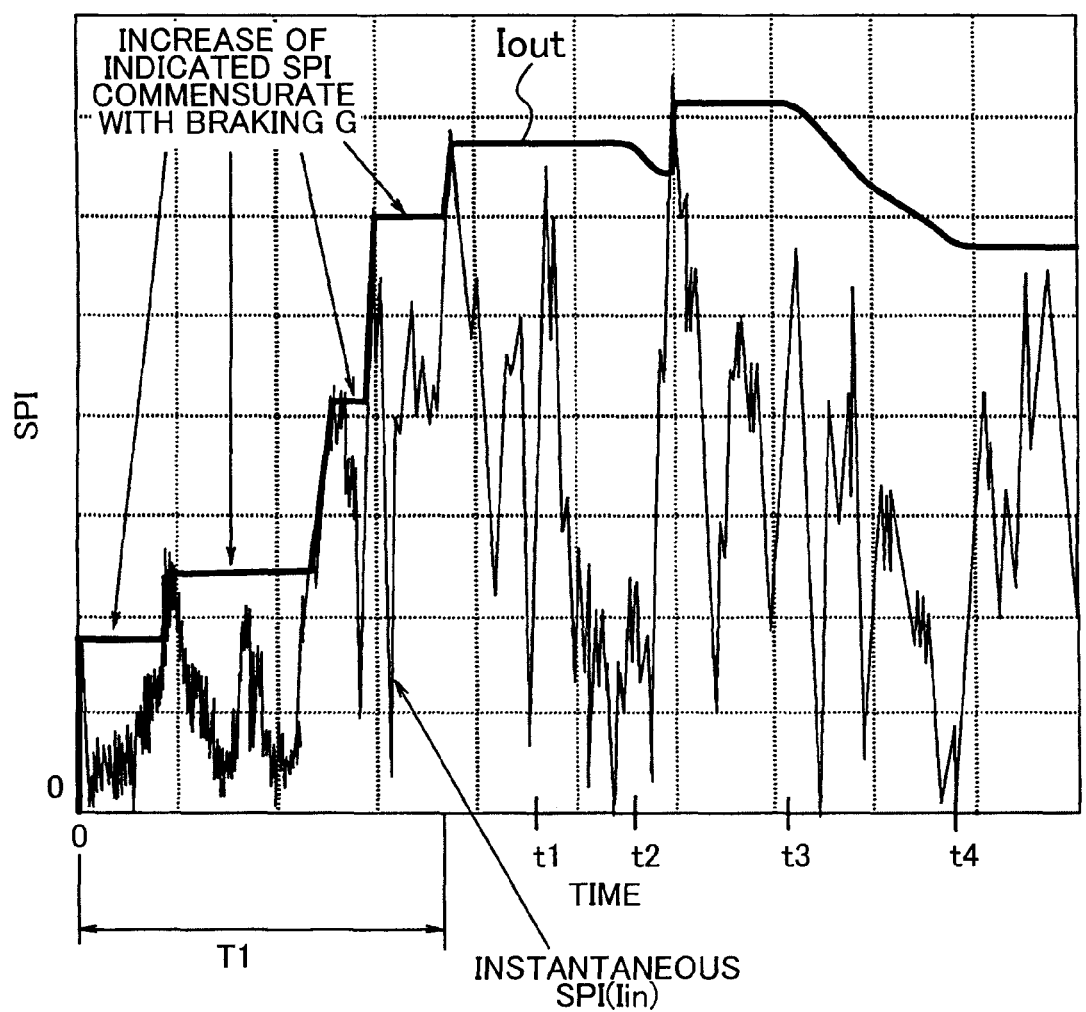
FIG. 10 is a diagram showing an example of the changing of an indicated sports index based on an instantaneous sports index.

In the control apparatus, an indicated sports index Iout is found from the instantaneous sports index Iin. The indicated sports index Iout is an index that is for use in the control of changing the vehicle's travel characteristic and that increases immediately when there is an increase in the instantaneous sports index Iin used as a basis for calculating the index, and declines with a delay when the instantaneous sports index Iin declines. In particular, in this embodiment, due to satisfaction of a predetermined condition, the indicated sports index Iout declines. FIG. 10 shows changes in the indicated sports index Iout that are found on the basis of changes in the instantaneous sports index Iin. In the example shown in FIG. 10, the instantaneous sports index Iin is shown by values plotted in FIG. 9, whereas the indicated sports index Iout is set at maximum values of the instantaneous sports index Iin, and the set maximum value of the indicated ports index Iout that is once set is maintained until a predetermined condition is satisfied. That is, the indicated sports index Iout changes quickly to the increase side, and changes relatively slowly to the decline side.

Concretely, in a time zone of T1 from the start of the control, for example, when the vehicle 1 brakes and turns, the instantaneous sports index Iin obtained from the changes in acceleration increases and decreases; however, since an instantaneous sports index Iin exceeding the then-existing maximum value occurs before the foregoing predetermined condition is satisfied, the indicated sports index Iout increases and is maintained in a stepwise fashion. On the other hand, at a time point t2 or a time point t3, the indicated sports index Iout begins to decline as the condition for decline of the indicated sports index Iout is satisfied, for example, in the case where the vehicle 1 transitions from a turning acceleration to a linear acceleration. Thus, the condition for lowering the indicated sports index Iout is establishment of a state in which the maintenance of the indicated sports index Iout at the existing large value is considered not to agree with the driver's intention, and is satisfied depending on the passage of time as a factor.

That is, the state in which the maintenance of the indicated sports index Iout at the existing large value is considered not to agree with the driver's intention is a state in which there is a large departure between the maintained indicated sports index Iout and the instantaneous sports index Iin that occurs during the maintenance of the indicated sports index Iout and such large departures continue and accumulate. Therefore, in this embodiment, the indicated sports index Iout is not lowered depending on the instantaneous sports index Iin that results from such an operation as the driver's temporarily undepressing the accelerator pedal 13, for example, in the case where the turning acceleration control is performed. The condition for lowering the indicated sports index Iout is satisfied in the case where a state in which the instantaneous sports index Iin resulting from such an operation as the driver's continually undepressing the accelerator pedal 13, or the like, is less than the maintained indicated sports index Iout has continued for a predetermined time, for example, in the case where the vehicle gently transitions into deceleration, or the like. Thus, the condition for starting to lower the indicated sports index Iout can be the duration of the state in which the instantaneous sports index Iin is less than the indicated sports index Iout. Alternatively, in order to more precisely reflect the actual vehicle's state of travel in the indicated sports index Iout, the condition for starting to lower the indicated sports index Iout can be that the time-integrated value of the deviation between the maintained indicated sports index Iout and the instantaneous sports index Iin reaches a predetermined threshold value. Incidentally, the threshold value can be set as appropriate, on the basis of results of travel experiments or simulations in accordance with the driver's intention or results of questionnaires about drivers' experiences in the actual driving, etc. If the foregoing time integrated value of the deviation is used, the indicated sports index Iout is lowered by factoring in the deviation between the indicated sports index Iout and the instantaneous sports index Iin as well as time, so that a vehicle's travel characteristic-changing control in which the actual vehicle's traveling state or behavior is more precisely reflected can be performed.

Incidentally, in the example shown in FIG. 10, the time of maintenance of the indicated sports index Iout up to the time point t2 is longer than the time of maintenance of the indicated sports index Iout up to the time point t3 because a control described below is carried out. That is, during an ending period of the foregoing time zone of T1, the indicated sports index Iout is increased to and then maintained at a predetermined value. Then, at the time point t1, which is prior to the satisfaction of the foregoing condition for starting to lower the indicated sports index Iout, the instantaneous sports index Iin increases, and the integrated value of the deviation of the instantaneous sports index Iin from the maintained indicated sports index Iout is less than or equal to a predetermined value. Incidentally, the predetermined value can be set as appropriate, by performing travel experiments or simulations in accordance with the driver's intention, or by taking into account the error in the calculation of the instantaneous sports index Iin. The instantaneous sports index Iin having become close to the maintained indicated sports index Iout in this manner means that the vehicle's state of travel at that time point has reached or come close to an accelerating-decelerating and/or turning state that has caused the instantaneous sports index Iin that has served as a basis for the presently maintained indicated sports index Iout. That is, even if a certain amount of time has elapsed following the time point at which the indicated sports index Iout is increased to the maintained value, the vehicle's state of travel is similar to the state of travel occurring at a time point prior to the elapse of the time; therefore, even if the present state is a state in which the instantaneous sports index Iin is less than the maintained indicated sports index Iout, satisfaction of the above-described condition for starting to lower the indicated sports index Iout is delayed and the indicated sports index Iout is maintained at the existing value. As a control or process for the delay, it suffices that the control is performed by resetting the accumulated value (cumulative value) of the aforementioned elapsed time or the integrated value of the deviation and re-starting the accumulation of elapsed time or the integration of the deviation or by reducing the foregoing accumulated value of the integrated value by a predetermined amount, or by suspending the accumulation or the integration for a certain time.

Figure 11:
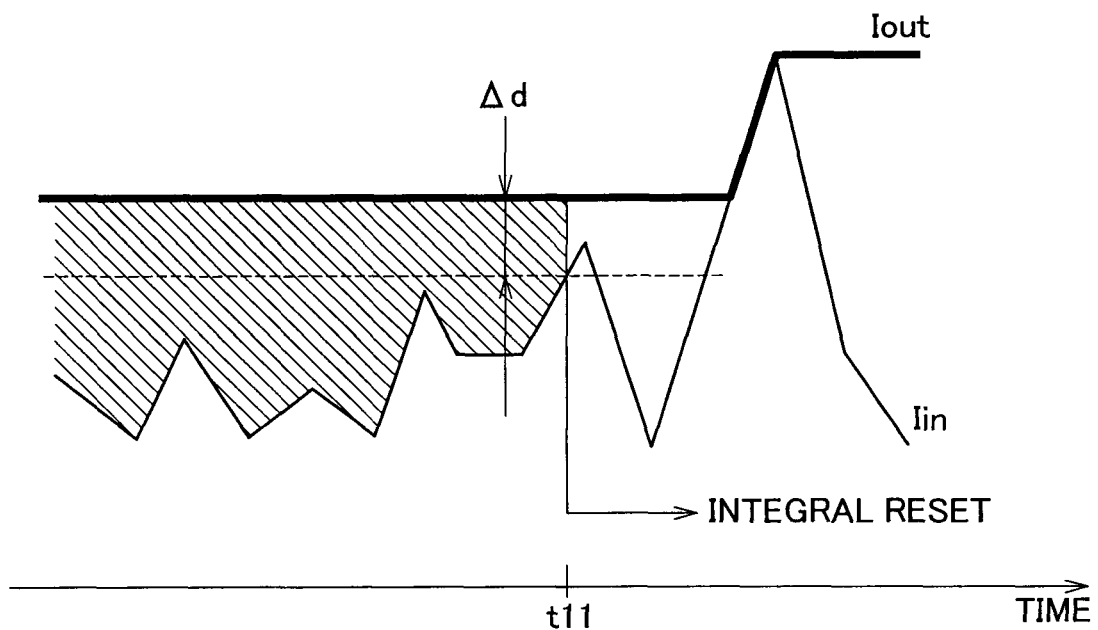
FIG. 11 is a diagram for illustrating a time integral of the deviation between the instantaneous sports index and the indicated sports index and a situation in which the value of the time integral is reset.

FIG. 11 is a schematic diagram for describing the foregoing integration of the deviation and the resetting thereof, in which the hatched area corresponds to the integral value of the deviation. During the course of the integration and the resetting thereof, the integrated value is reset at a time point t11 at which the difference between the instantaneous sports index Iin and the indicated sports index Iout becomes less than or equal to a predetermined value Δd, and then the integration of the deviation is started again. Specifically, the integrated value is reset on the basis of whether or not the deviation of the found value of the instantaneous sports index Iin and the maintained value of the indicated sports index Iout is less than or equal to the threshold value. Therefore, the condition for starting to lower the indicated sports index Iout is not satisfied, so that the indicated sports index Iout is maintained at the existing value. Then, if after the integration is restarted, the instantaneous sports index Iin becomes greater than the maintained indicated sports index Iout, the indicated sports index Iout is updated to and maintained at a greater value that is commensurate with the instantaneous sports index Iin, and the integrated value is reset.

If it is determined whether or not the condition for starting to lowering the indicated sports index Tout is satisfied on the basis of the foregoing integrated value, the degree or gradient of the decline of the indicated sports index Tout may be varied. Since the foregoing integrated value is a value obtained through the time integration of the deviation between the maintained indicated sports index Tout and the instantaneous sports index Iin, if the deviation is large the integrated value reaches a predetermined value in a short period of time, so that the condition is satisfied. Besides, if the deviation is small, the foregoing integrated value reaches the predetermined value after a relatively long time, so that the condition is satisfied. Therefore, if the condition is satisfied in a short time, it means that the amount of decline of the instantaneous sports index Iin relatively to the indicated sports index Tout is large and therefore the indicated sports index Tout is greatly apart from the driver's intention. Therefore, in such a case, the indicated sports index Tout is decreased at a large proportion or gradient. Conversely, if the time before the condition is satisfied is relatively long, the amount of decline of the instantaneous sports index Iin relative to the maintained indicated sports index Tout is small and therefore the maintained indicated sports index Tout cannot be said to be very greatly apart from the driver's intention at that time point. Therefore, in such a case, the indicated sports index Tout is decreased slowing at a small proportion or gradient. This will quickly and precisely correct the departure between the driver's intention and the indicated sports index Tout for use for setting the travel characteristic, so that the travel characteristic of the vehicle 1 that agrees with the vehicle's state of travel can be set. Therefore, in the case where the indicated sports index Iout is to be decreased, the degree or gradient of the decrease of the indicated sports index Iout may be varied according to the length of the elapsed maintenance time of the indicated sports index Tout.

The instantaneous sports index Iin is calculated on the basis of the aforementioned so-called actual acceleration or estimated acceleration, and the indicated sports index Iout determined from the instantaneous sports index Iin includes the environment of travel of the vehicle, such as the road slope, the presence or absence of a corner, the radius of curvature of a corner, etc. as well as the driver's inclination in driving. This is because the acceleration of the vehicle 1 changes depending on the state of the traveling road, and the driver performs accelerating-decelerating operation depending on the traveling road, and the acceleration of the vehicle changes depending on the accelerating-decelerating operation. The control apparatus of this embodiment uses the indicated sports index Iout for the control of the travel characteristic of the vehicle 1. The travel characteristic handled by the control apparatus includes the output characteristic of a drive force source, the acceleration characteristic, the braking characteristic, the steering characteristic, the suspension characteristic, the noise characteristic, etc. These characteristics are appropriately set by changing the control characteristic of the throttle valve 11, the speed shift characteristic of the transmission 14, the damping characteristic of the suspension apparatus 4 caused by the shock absorber 5, the assist characteristic of the assist mechanism 19, etc., through the use of actuators that are provided for each of the characteristics. A general tendency of the change in the vehicle's travel characteristic is that the greater the indicated sports index Iout, the more sportier traveling can be achieved.

The control apparatus changes the drive characteristic of the vehicle 1 and the chassis characteristic on the basis of the indicated sports index Iout so that the vehicle's travel characteristic will agree with the driver's inclination in driving. As an example of the drive characteristic, the demanded maximum acceleration rate is found on the basis of the indicated sports index Iout, and the speed change ratio or the speed change step (gear ratio) is set on the basis of the demanded maximum acceleration rate. Herein, the demanded maximum acceleration rate prescribes a marginal drive force. For example, a demanded maximum acceleration rate of 100% means a state in which a maximum acceleration that the vehicle 1 can generate is feasible, and means, for the transmission 14, the setting of a speed change ratio at which the engine rotation speed becomes the maximum, or the greatest speed change ratio (the speed change ratio at an extreme end in the low vehicle speed side). Besides, for example, a demanded maximum acceleration rate of 50% is a state in which half the maximum acceleration that the vehicle 1 can generate is feasible, and means for the transmission 14 the setting of an intermediate speed change ratio. Besides, the demanded maximum acceleration rate is set beforehand separately for each vehicle or each vehicle model, and the indicated sports index Iout is used to change the predetermined demanded maximum acceleration rate (i.e., the basic characteristic in the drive force control). Concretely, the basic characteristic is changed so that the drive force, that is, the demanded maximum acceleration rate becomes large, as the indicated sports index Iout becomes greater. In other words, the amount of change in the basis characteristic of the drive force increases according to increases in the indicated sports index Iout.

Besides, the chassis characteristic is the support characteristic or damper characteristic of the vehicle body caused by the suspension mechanism of the suspension apparatus 4, or the steering characteristic that is the yaw rate or the amount of turn of the vehicle relative to the amount of steering. If the indicated sports index Iout is large, these chassis characteristics are changed so that the behavior of the vehicle 1 becomes quicker. For example, the greater the indicated sports index Iout, the harder side the damper characteristic is changed to, so that the sinking and bouncing of the vehicle body will be restrained. Besides, the steering characteristic is changed so that the ratio between the amount of turn of the steering wheel and the steer angle of the road wheels becomes closer to one to one and therefore the direct feel in steering becomes stronger. In other words, the amount of change for causing the support characteristic of the vehicle body to be sportier increases with increases in the indicated sports index Iout.

Thus, since the travel characteristic of the vehicle 1 is changed on the basis of the above-described indicated sports index Iout, the environment of travel of the vehicle 1 and the driver's preference and intention regarding the travel of the vehicle can be reflected in the control, and the travel characteristic of the vehicle 1 can be set. Furthermore, the control apparatus of the embodiment, for the purpose of more precisely setting the travel characteristic of the vehicle 1, executes a control of changing the manner of changing the travel characteristic of the vehicle 1 or the degree of change of the travel characteristic on the basis of, for example, changes in the acceleration of the vehicle 1, changes in the contents of driving operations.

A basic construction of the control is shown by a conceptual flowchart in FIG. 1. In an example shown herein, in a control of changing the travel characteristic of the vehicle 1 on the basis of the instantaneous sports index Iin and the indicated sports index Iout, when the indicated sports index Iout is to be set on the basis of changes in the state of travel of the vehicle 1, the amount of change of the indicated sports index Iout is adjusted on the basis of the vehicle's state of travel that immediately precedes a change in the vehicle's state of travel.

In the flowchart in FIG. 1, firstly, an instantaneous sports index Iin is computed from the acceleration caused because of the traveling of the vehicle 1, that is, the vehicle's state of travel, as well as the accelerator operation amount, the brake operation amount or the amount of steering, etc. which change the behavior of the vehicle 1, such as the vehicle speed, the traveling direction, etc. (step S1). For example, in the case where the acceleration of the vehicle 1 (including a resultant acceleration) is large, a travel characteristic is set such that sporty driving can be easily done. Concretely, control characteristics of the engine 9 and the transmission 14 are set so that the drive force becomes relatively large, or the support characteristic (e.g., the damper characteristic) of the vehicle body is set to a harder characteristic such that the bump and rebound of the vehicle body less readily occurs. On the other hand, in the case where exists information that indicates that the road surface friction coefficient μ of the traveling road surface is low or the case where the acceleration of the vehicle 1 is small, among other cases, it is preferable that the drive force of the vehicle 1 be relatively small, so that the value of the instantaneous sports index Iin is set so as to mitigate or restrain the sporty characteristics.

As described above, the indicated sports index Iout is found on the basis of the instantaneous sports index Iin. That is, the indicated sports index Iout is computed on the basis of the value of the instantaneous sports index Iin determined in step S1. It is to be noted herein that, for example, if the driver performs a brake operation and therefore an acceleration occurs on the vehicle 1, the instantaneous sports index Iin accordingly increases. Then, as the instantaneous sports index Iin increases, the indicated sports index Iout also increases, so that a vehicle's travel characteristic that is more suitable to the so-called sports driving is set. However, the brake operations that serve as a factor for increasing the instantaneous sports index Iin and the indicated sports index Iout as described above include not only a quick brake operation that is performed during the so-called sports driving but also, for example, an emergency braking operation for avoiding a danger, during an ordinary state of travel that is other than the sports driving. Therefore, when the indicated sports index Iout increases due to a quick brake operation that is performed during the sports driving, the setting of a sportier characteristic results. Therefore, an appropriate control that follows the driver's intention in driving can be executed. On the other hand, in the case where the indicated sports index Iout increases due to, for example, the emergency braking for tentatively avoiding a danger, there sometimes occurs a case where despite the driver's intention, a level of sporty characteristic that is farther apart from the driver's intention is set, and therefore the driver's intention in driving and the travel characteristic of the vehicle 1 depart from each other.

Therefore, in this embodiment, for example, in the case where a driving operation such as the aforementioned brake operation, the accelerator operation, the steering operation, etc., is performed, or the case where the acceleration of the vehicle 1 changes due to a change in the traveling road surface state, an external disturbance, etc., the control apparatus adjusts the amount of change in the indicated sports index Iout when such a change is to be made, and particularly restrains the amount of change in the indicated sports index Iout in the direction of increase of the indicated sports index Iout when such a change is to be made, on the basis of the state of travel of the vehicle 1 occurring immediately prior to the execution of one of the aforementioned driving operations or to the change in the acceleration of the vehicle 1. That is, when the instantaneous sports index Iin is calculated in step S1, the control of restraining the amount of change in the indicated sports index Iout as described above is executed on the basis of the state of travel of the vehicle 1 occurring at the time of the calculation. Concretely, as the state of travel of the vehicle 1 occurring at that time point, for example, the accelerator operation amount, the operating speed of the accelerator pedal 13, the engine rotation speed of the engine 9, the gear speed (or the speed change ratio) of the transmission 14, etc. are taken into account in order to execute a determination process as to whether or not to increase the indicated sports index Iout (step S2). Besides, a determination process as to whether or not to decline the indicated sports index Iout is executed (step S3).

Then, on the basis of the new indicated sports index Iout updated in the steps S2 and S3, the travel characteristic of the vehicle 1 is set (step S4). After that, this routine temporarily ends.

Figure 2:
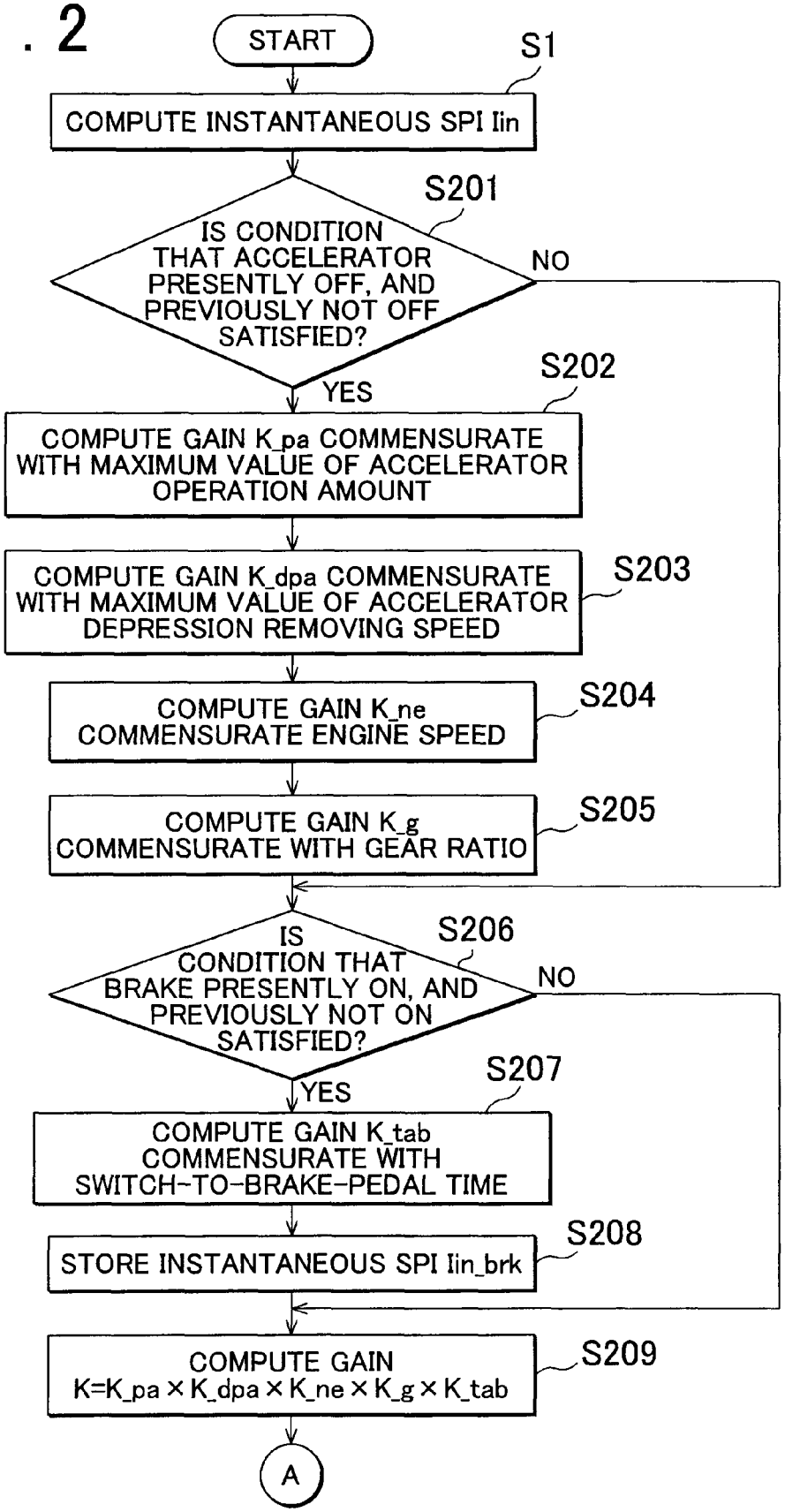
FIG. 2 is a diagram showing an earlier half portion of a flowchart for describing a concrete example of the control that is executed by the control apparatus in accordance with an embodiment of the invention.
Figure 3:
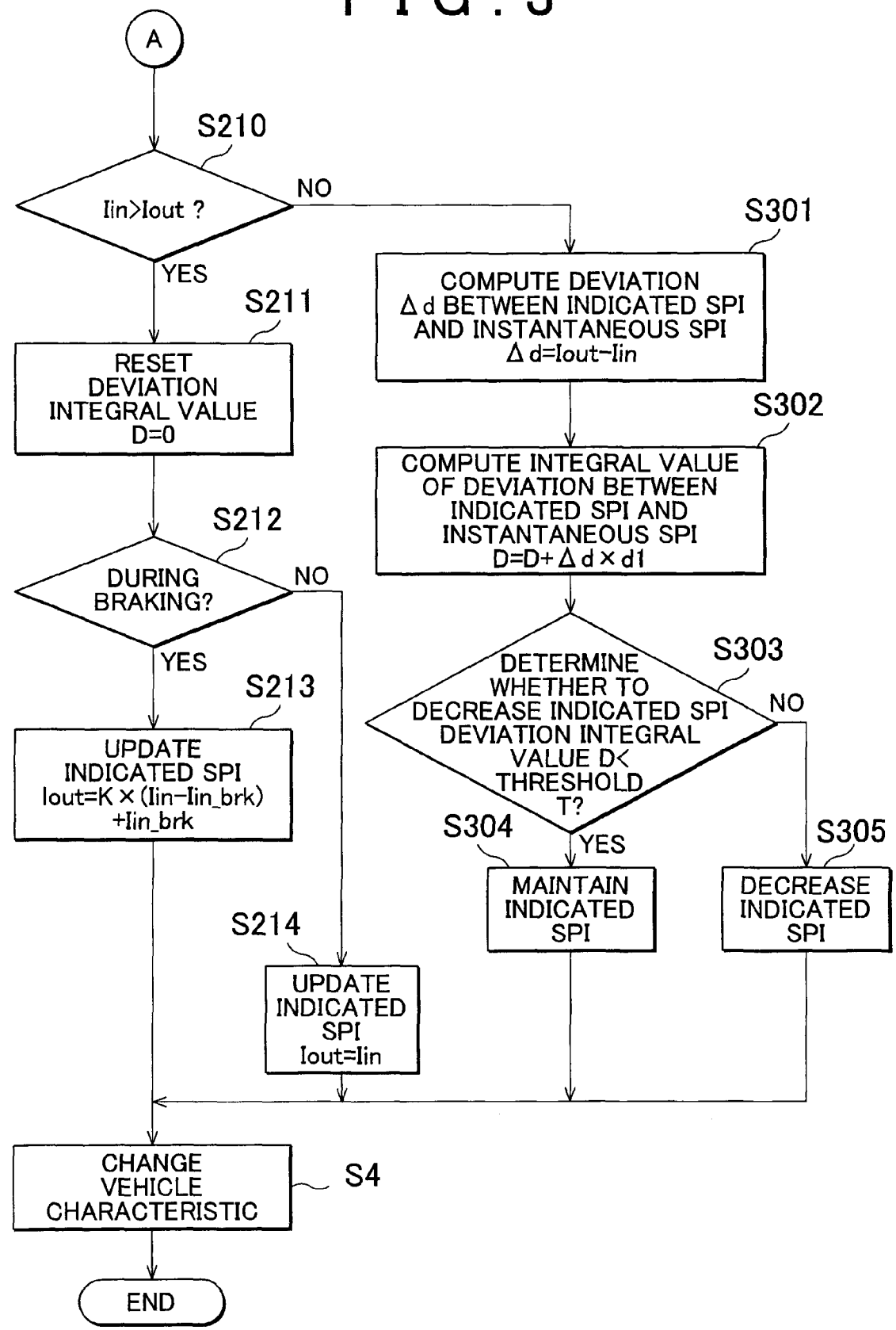
FIG. 3 is a diagram showing the latter half portion of the flowchart.

Further details of the contents of the control shown as an example in FIG. 1 are shown in flowcharts in FIGS. 2 and 3. Firstly, in the flowchart shown in FIG. 2, after the instantaneous sports index Iin is calculated in step S1 as shown in the flowchart in FIG. 1, it is determined whether or not the state of operation of the accelerator pedal 13 is presently an off-state, and was not the off-state (i.e., was the on-state) (step S201). That is, it is determined whether or not the value detected by the accelerator operation amount sensor 21 during the previous execution of the routine was other than 0 and the value detected by the accelerator operation amount sensor 21 during the present execution of the routine is 0, that is, whether or not during the present execution of the routine, the depression of the accelerator pedal 13 is undone (or removed) to an accelerator operation amount of 0.

If an affirmative determination is made in step S201 because there was depression of the accelerator pedal 13 during the previous execution of the routine and the depression of the accelerator pedal 13 is undone (removed, or released) during the present execution of the routine, the process proceeds to steps S202 to S205, in which gains commensurate with the states of travel immediately prior to the execution of the brake operation described below are calculated. The gain herein is a control gain that is applied in the control of updating the indicated sports index Iout on the basis of the instantaneous sports index Iin, and is set according to each of various states of travel, for example, the accelerator operation amount, the speed of release of the accelerator pedal, the engine rotation speed, the speed change ratio of the transmission, etc.

That is, a gain K_pa commensurate with the accelerator operation amount of the accelerator pedal 13 is found (step S202). The gain K_pa is a gain for reflecting information regarding the accelerator operation amount immediately prior to the braking (e.g., a maximum value of the accelerator operation amount) in the control of updating the indicated sports index Iout, and concretely is set to a value that causes the amount of increase in the indicated sports index Iout during braking to be less in the case where the accelerator operation amount is small than in the case where the accelerator operation amount is high, or that prohibits increase of the indicated sports index Iout. Then, this gain K_pa can be found from, for example, a pre-set map in which a relationship between the accelerator operation amount and the gain K_pa is recorded as shown in FIG. 4. Alternatively, this gain K_pa can also be calculated on the basis of a predetermined computation expression.

Besides, the gain K_dpa commensurate with the accelerator pedal depression removing speed of the accelerator pedal 13 (step S203). The accelerator pedal depression removing speed is, in other words, an accelerator pedal returning speed, and a speed at which the depression of the accelerator pedal 13 is released and the amount of depression of the accelerator pedal 13 is returned to 0. This gain K_dpa is a gain for reflecting the information regarding the accelerator pedal depression removing speed immediately prior to the braking in the control of updating the indicated sports index Iout. Concretely, the gain K_dpa is set at such a value that in the case where the accelerator pedal depression removing speed is slow, the amount of increase in the indicated sports index Iout during braking is made less than in the case where the accelerator pedal depression removing speed is great, or alternatively increase of the indicated sports index Iout is prohibited. This gain K_dpa can be found, for example, from a pre-set map in which a relation between the accelerator pedal depression removing speed and the gain K_dpa is recorded as shown in FIG. 5. Alternatively, this gain K_dpa can also be calculated on the basis of a predetermined computation expression. When a quick brake operation is performed during a normal driving, the accelerator pedal depression removing speed is lower than the accelerator pedal depression removing speed during a sports driving, and thus, the gain K_dpa is small, and therefore, it is possible to restrain the increase in the indicated sports index Iout.

Figure 6:
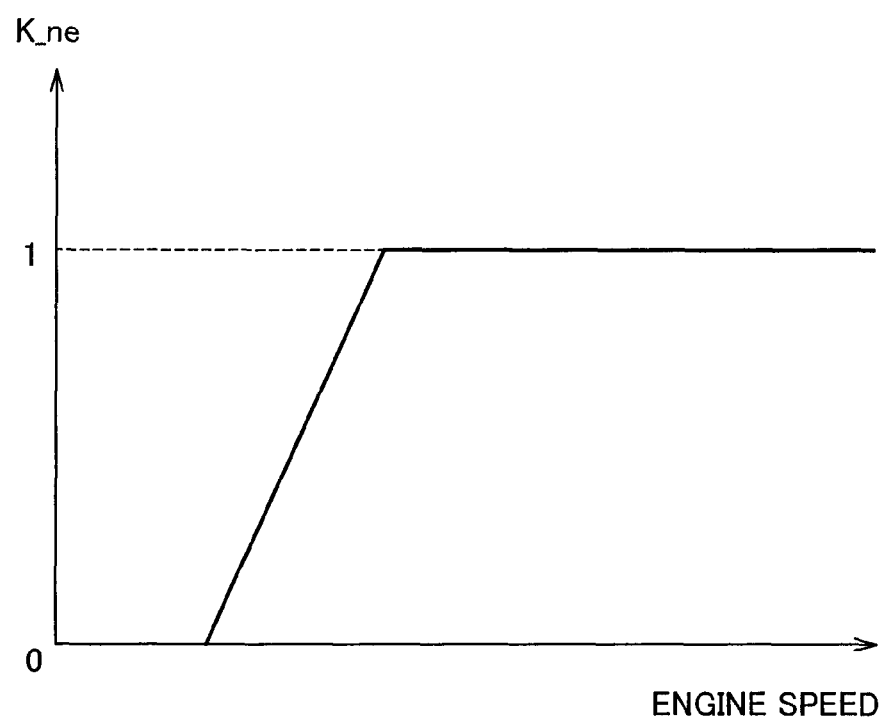
FIG. 6 is a diagram showing an example of a map for use in the computation of a gain regarding the engine rotation speed in the control shown by the flowchart in FIG. 2.

Besides, the gain K_ne commensurate with the engine rotation speed of the engine 9 is found (step S204). This gain K_ne is for reflecting information regarding the engine rotation speed immediately prior to the braking in the control of updating the indicated sports index Iout. Concretely, the gain K_ne is set at a value such that in the case where the engine rotation speed is low, the amount of increase of the indicated sports index Iout during braking is made less than in the case where the engine rotation speed is high, or alternatively increase of the indicated sports index Iout is prohibited. This gain K_ne can be found, for example, from a pre-set map in which a relationship between the engine rotation speed and the gain K_ne is recorded as shown in FIG. 6. Alternatively, this gain K_ne can also be calculated on the basis of a pre-set computation expression.

Figure 7:
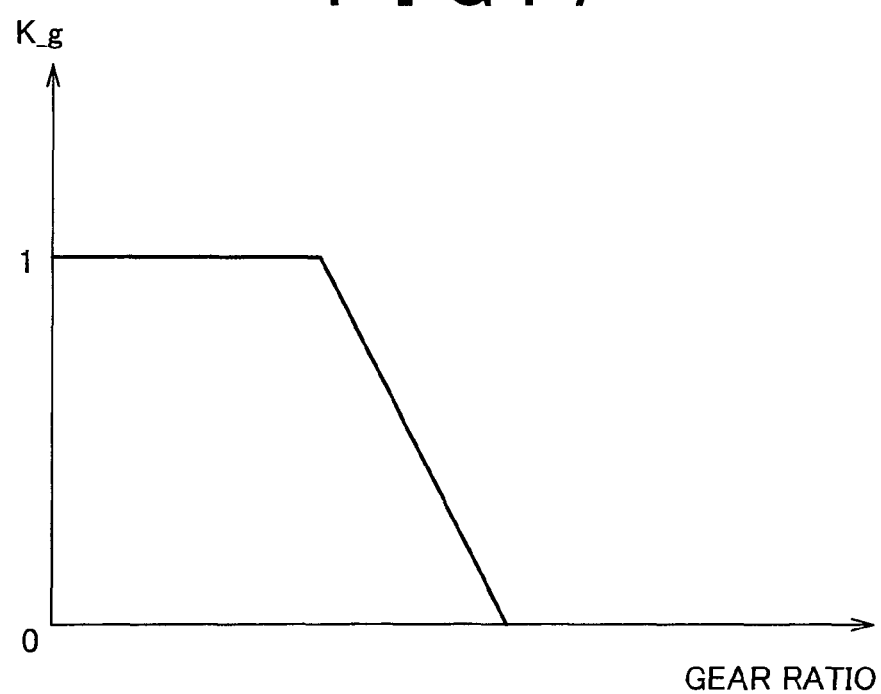
FIG. 7 is a diagram showing an example of a map for use in the computation of a gain regarding the speed change ratio (gear ratio) of a transmission in the control shown by the flowchart in FIG. 2.

Besides, a gain K_g commensurate with the gear ratio (i.e., the gear step, the speed change step, or the speed change ratio) of the transmission 14 is found (step S205). This gain K_g is for reflecting information regarding the speed change step or the speed change ratio of the transmission 14 immediately prior to the braking in the control of updating the indicated sports index Iout. Concretely, the gain K_g is set at a value such that in the case where the gear ratio is high, the amount of increase of the indicated sports index Iout during braking is made less than in the case where the gear ratio is low, or alternatively increase of the indicated sports index Iout is prohibited. This gain K_g can be found, for example, from a pre-set map in which a relationship between the gear ratio and the gain K_g is recorded as shown in FIG. 7. Alternatively, this gain K_g can also be calculated on the basis of a pre-set computation expression.

After the gains regarding the foregoing states of travel are found in steps S202 to S205, it is determined whether or not the state of operation of the brake apparatus 7 is presently the on-state, and was previously other than the on-state (i.e., was the off-state) (step S206). That is, it is determined whether or not the brake switch of the brake apparatus 7 was off during the previous execution of the routine and the brake switch of the brake apparatus 7 is on during the present execution of the routine, in other words, whether or not during the present execution of the routine, the brake pedal 8 has been depressed and therefore the braking by the brake apparatus 7 has started.

Besides, if a negative determination is made in step S201 because the accelerator pedal 13 was in the released state during the previous execution of the routine and/or the accelerator pedal 13 is in the depressed state during the present execution of the routine, the process proceeds to step S206, skipping the controls of finding the foregoing gains in steps S201 to S205. In S206, the previous control is executed in the same manner.

Figure 8:
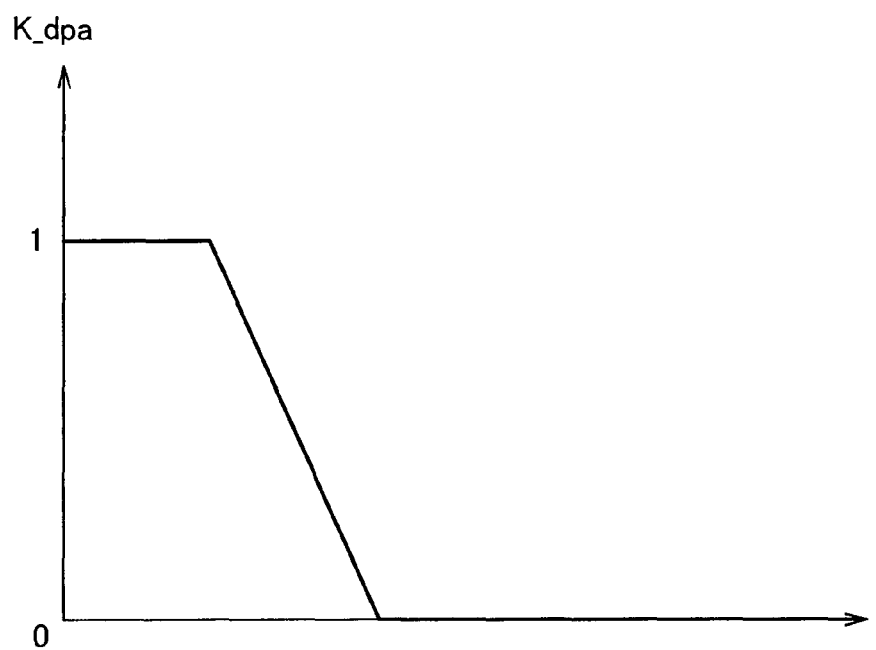
FIG. 8 is a diagram showing an example of a map for use in the computation of a gain regarding the switch-to-brake-pedal time in the control shown by the flowchart in FIG. 2.

If an affirmative determination is made in step S206 because the brake switch of the brake apparatus 7 was off during the previous execution of the routine and the brake switch of the brake apparatus 7 has turned on during the present execution of the routine, that is, during the present execution of the routine, the braking by the brake apparatus 7 has started, the process proceeds to step S207, in which a gain K_tab commensurate with the switch-to-brake-pedal time is found. The switch-to-brake-pedal time is a time that is needed for the driver to switch from depressing the accelerator pedal 13 to depressing the brake pedal 8. This gain K_tab is for reflecting information regarding the switch-pedal between the accelerator pedal 13 and the brake pedal 8 immediately prior to the braking in the control of updating the indicated sports index Iout. Concretely, the gain K_tab is set at a value such that in the case where the switch-to-brake-pedal time is long, the amount of increase of the indicated sports index Iout during braking is made less than in the case where the switch-to-brake-pedal time is short, or alternatively increase of the indicated sports index Iout is prohibited. This gain K_tab can be found from a pre-set map in which a relationship between the switch-to-brake-pedal time and the gain K_tab is recorded as shown in FIG. 8. Alternatively, the gain K_tab may be calculated on the basis of a pre-set computation expression. When a quick brake operation is performed during a normal driving, the switch-to-brake-pedal time is longer than the switch-to-brake-pedal time during a sports driving, and thus, the gain K_tab is small, and therefore, it is possible to restrain the increase in the indicated sports index Iout.

Subsequently, the value of the instantaneous sports index Iin_brk during the braking is stored (step S208). As described above, as the brake apparatus 7 is actuated to perform a brake operation, an acceleration occurs on the vehicle 1. Concretely, an acceleration-deceleration in the longitudinal direction of the vehicle 1 occurs. Therefore, the value of the instantaneous sports index Iin calculated on the basis of a resultant acceleration of the vehicle 1 also changes. Therefore, in step S208, the instantaneous sports index Iin immediately prior to the change caused by the brake operation is stored temporarily as an instantaneous sports index Iin_brk.

Then, a gain K is computed (step S209). The gain K is a value obtained by unifying all the gain K_pa, K_dpa, K_ne, K_g and K_tab. Concretely, the gain K is calculated as K=K_pa×K_dpa×K_ne×K_g×K_tab.

Incidentally, if a negative determination is made in step S206 because the brake pedal 8 was in the depressed state during the previous execution of the routine and/or the brake pedal 8 is released during the present execution of the routine, the process skips the controls of steps S207 and S208, and goes to step S209, in which the previous control is similarly executed. In this embodiment, in S201 to S207, it is determined whether or not the driver has performed a traveling operation for the quick braking. Besides, it is determined whether or not the driver liked the sporty driving before performing a driving operation for emergency braking.

Subsequently, in the flowchart shown in FIG. 3, the instantaneous sports index Iin and the indicated sports index Iout are compared, and it is determined whether or not the instantaneous sports index Iin is larger than the indicated sports index Iout (step S210). If the instantaneous sports index Iin is larger than the indicated sports index Iout and therefore an affirmative determination is made in step S210, the process proceeds to step S211, in which an integral D of the deviation between the indicated sports index Iout and the instantaneous sports index Iin is reset. That is, the deviation integral D is set as D=0.

Then, it is determined whether or not the vehicle 1 is braking (step S212). As described above, if the vehicle 1 is braked by the brake apparatus 7, when the characteristic of the vehicle 1 is set on the basis of the indicated sports index Iout, a new acceleration occurs on the vehicle 1. This increase in acceleration is a factor for increasing the instantaneous sports index Iin and the indicated sports index Iout. However, when a brake operation is performed, the vehicle's state of travel immediately prior to the execution of the brake operation is taken into account for updating the indicated sports index Iout, in order to appropriately reflect the driver's intention in driving.

Therefore, if an affirmative determination is made in step S212 because the vehicle 1 is in a braking state, the process proceeds to step S213. In step S213, the indicated sports index Iout is updated on the basis of the gain K calculated and stored in a process of steps described above and the instantaneous sports index Iin_brk occurring immediately prior to the change caused by the braking. Concretely, the indicated sports index Iout is calculated as Iout=K×(Iin−Iin_brk)+Iin_brk, and the calculated indicated sports index Iout is set as a new update value.

Thus, in the case where the vehicle 1 is braked, the gain K is applied to update the indicated sports index Iout, whereby the amount of change in the indicated sports index Iout is restrained. Specifically, the gain K herein is a value that is set within the range of "0≤K≤1" as shown in the maps in FIGS. 4 to 8, and is set so as to restrain the amount of change of the indicated sports index Iout or prohibits the increase thereof (if gain K=0) according to the state of travel of the vehicle 1 immediately prior to the start of a braking operation, that is, the contents of the driver's acceleration operations, such as the accelerator operation amount, the accelerator pedal depression removing speed, the switch-to-brake-pedal time, etc., or the engine rotation speed of the engine 9, or the gear ratio (speed change ratio) of the transmission 14.

For example, in the case where the accelerator operation amount is low, the amount of increase of the indicated sports index Iout during braking is restrained in comparison with the case where the accelerator operation amount is high, or alternatively increase of the indicated sports index Iout is prohibited. Besides, in the case where the accelerator pedal depression removing speed is slow, the amount of increase of the indicated sports index Iout during braking is restrained in comparison with the case where the accelerator pedal depression removing speed is fast, or alternatively increase of the indicated sports index Iout is prohibited. Besides, in the case where the engine rotation speed is low, the amount of increase of the indicated sports index Iout during braking is restrained in comparison with the case where the engine rotation speed is high, or alternatively increase of the indicated sports index Iout is prohibited. Besides, in the case where the gear ratio of the transmission 14 is high, the amount of increase of the indicated sports index Iout during braking is restrained in comparison with the case where the gear ratio is low, or alternatively increase of the indicated sports index Iout is prohibited. In the case where the switch-to-brake-pedal time is long, the amount of increase of the indicated sports index Iout during braking is restrained in comparison with the case where the switch-to-brake-pedal time is short, or alternatively increase of the indicated sports index Iout is prohibited.

On the other hand, in the case where a negative determination is made in step S212 because the vehicle 1 is not in the braking state, the process proceeds to step S214, in which the indicated sports index Iout is updated so as to equal the instantaneous sports index Iin set at a value that is larger than the current value of the indicated sports index Iout. That is, the indicated sports index Iout is set as Iout=Iin, and the indicated sports index Iout is increased in effect.

After the indicated sports index Iout is updated in step S213 or step S214, the travel characteristic of the vehicle 1 is set on the basis of the newly updated indicated sports index Iout (step S4). After that, this routine temporarily ends.

On another hand, in the case where a negative determination is made in step S210 because the instantaneous sports index Iin is not larger than the indicated sports index Iout, that is, because the indicated sports index Iout is greater than or equal to the instantaneous sports index Iin, the process proceeds to step S301, in which a deviation Δd between the indicated sports index Iout and the instantaneous sports index Iin is computed. That is, the deviation Δd is calculated as in Δd=Iout−Iin.

Next, an integral D of the deviation between the indicated sports index Iout and the instantaneous sports index Iin is computed (step S302). It is to be noted herein that the deviation is a difference between a value of the index that is found from the vehicle's state of travel at that time point, such as the acceleration or the like, and a value of the index that has been set or maintained. In the example described herein, the deviation is the deviation Δd between the value of the indicated sports index Iout that has been set or maintained at that time point and the value of the instantaneous sports index Iin at that time point. The integrated value (or accumulated value) D of the deviation Δd is calculated as in D=D+deviation Δd·d1. In this equation, d1 is the calculation cycle.

Then, it is determined whether or not the integrated value D of the deviation between the indicated sports index Tout and the instantaneous sports index Iin is smaller than a pre-set decrease start threshold value T (step S303). This decrease start threshold value T is a threshold value for prescribing the amount of time that elapses before the indicated sports index Iout starts to be decreased in the case where the indicated sports index Tout is being maintained at a predetermined value. In other words, the decrease start threshold value T is a threshold value for prescribing the length of time during which the value of the indicated sports index Tout is maintained at the current value. Therefore, the decrease start threshold value T is set so that when the deviation integral D becomes greater than or equal to the decrease start threshold value T, it is determined that the decrease of the indicated sports index Tout is to be started.

Therefore, in the case where an affirmative determination is made in step S303 because the integral D of the deviation between the indicated sports index Iout and the instantaneous sports index Iin is smaller than the decrease start threshold value T, the process proceeds to step S304, in which the indicated sports index Iout is maintained at the present value. On the other hand, in the case where a negative determination is made in step S303 because the integral D of the deviation between the indicated sports index Iout and the instantaneous sports index Iin is greater than or equal to the decrease start threshold value T, the process proceeds to step S305, in which the indicated sports index Iout is decreased.

After step S304, in which the indicated sports index Iout is maintained, or after step S305, in which the indicated sports index Iout is decreased, the travel characteristic of the vehicle 1 is set on the basis of the maintained or decreased indicated sports index Iout (step S4). After that, this routine temporarily ends.

As described above, according to the control apparatus, the travel characteristic of the vehicle 1 that includes, for example, the motive power characteristic, the steering characteristic, the suspension characteristic, etc., is changed on the basis of the acceleration that has occurred on the vehicle 1 or the acceleration that is predicted to occur on the vehicle 1. Specifically, the contents of driving operations performed by the driver which cause acceleration on the accelerator operation, such as the brake operation, the steering operation, etc., that is, the driver's intentions regarding the vehicle's state of travel, are reflected in the setting of the travel characteristic of the vehicle 1. Therefore, the travel characteristic of the vehicle 1 can be caused to precisely reflect the actual behavior of the vehicle 1, the driver's preference, habits, etc.

Then, when the travel characteristic of the vehicle 1 is to be changed as the acceleration changes as described above, the amount of change from the current indicated sports index Iout to a newly set indicated sports index Iout is adjusted according to the travel characteristic of the vehicle 1 immediately prior to the change of the acceleration, that is, according to the indicated sports index Iout that determines the pre-change travel characteristic present immediately before the acceleration changes. For example, in the case where the pre-change indicated sports index Iout is a large value that agrees with the so-called sports driving that allows quick operation responses when a change occurs in the acceleration on the vehicle 1 and the instantaneous sports index Iin and the indicated sports index Iout are to be changed, the amount of change in the indicated sports index Iout is adjusted in the setting of the post-change indicated sports index Iout so that the travel characteristic of the vehicle is set more suitable to the sports driving. On another hand, in the case where the pre-change indicated sports index Iout is a value that is suitable to a normal driving that is not the so-called sports driving, the amount of change in the indicated sports index Iout is adjusted in the setting of a post-change indicated sports index Iout so that the travel characteristic of the vehicle is not set suitably for a level of sports driving that is not intended by the driver, that is, so that the indicated sports index Iout does not increase to a level that is not intended by the driver, or alternatively the change of the indicated sports index Iout is prohibited. Therefore, in the case where a change occurs in the acceleration of the vehicle 1 during a travel and the control of changing the travel characteristic of the vehicle 1 is executed, it is possible to execute a suitable control that follows the driver's intention in driving, so that the degree of the driver's satisfaction and the drivability can be improved.

Besides, when a brake operation is performed by the brake apparatus 7 during a travel of the vehicle 1 and the acceleration (deceleration) of the vehicle 1 changes so that the instantaneous sports index Iin and the indicated sports index Iout of the vehicle 1 are to be changed, the amount of change from the pre-change indicated sports index Iout to a newly set post-change indicated sports index Tout is restrained according to the pre-change instantaneous sports index Iin and the pre-change indicated sports index Iout present immediately before the brake operation starts, and the indicated sports index Iout whose value has increased on the basis of the change in acceleration as well as the contents of driving operations performed immediately prior to the start of the brake operation, and the engine rotation speed of the engine 9 and the speed change ratio of the transmission 14 occurring immediately prior to the braking. The brake operation that is a factor for changing the acceleration of the vehicle 1 includes quick brake operations performed during the so-called sports driving and emergency brake operations for avoiding a risk. For example, in the case where such an emergency brake operation is performed when the pre-change indicated sports index Iout has a value that is suitable to a normal driving that is not the so-called sports driving, the amount of change from the pre-change indicated sports index Iout to a newly set post-change indicated sports index Iout is restrained so as to avoid the post-change indicated sports index Iout from being set, despite the driver's intention, at a value that corresponds to a level of sports driving which is farther apart from the driver's intention. Therefore, the actual behavior of the vehicle 1, the driver's preference and the driver's intention in driving, etc. can be precisely reflected in the setting of the travel characteristic of the vehicle 1.

Incidentally, the determination as to whether or not the pre-change travel characteristic of the vehicle 1 is that of the so-called sports driving can be also carried out in manners other than what have been shown above in conjunction with concrete examples, that is, for example, by determining whether or not the presently performed brake operation is an emergency operation for safety through the use of a situation determination apparatus that determines a situation forward or around the vehicle by using radar, infrared rays, etc. In the above-described embodiment, when a quick brake operation is performed (i.e., when the longitudinal acceleration is high) in the case where it has been determined that a normal driving is performed based on the sports index before the quick brake operation is performed, it is determined that the brake operation is not based on the intention to perform a sports driving, and thus, the sports index is not increased.

The invention claimed is:

1. A vehicle control apparatus that changes a travel characteristic of a vehicle based on a change in acceleration of the vehicle, comprising
a controller configured to set an index to be a first value corresponding to a first degree of vehicle behavior, and to set the index to be a second value corresponding to a second degree of vehicle behavior, the first value being greater than the second value, the first degree corresponding to a vehicle behavior quicker than a vehicle behavior to which the second degree corresponds,
the controller being further configured to set a travel characteristic based on the index, to change the index in response to the change in acceleration, and to selectively adjust an amount of change of the index in response to the change in acceleration based on at least one of
(i) a pre-change index present immediately prior to the change in the acceleration,
(ii) an accelerating operation performed by the driver immediately before a braking operation is started,
(iii) an output rotation speed of a drive force source of the vehicle occurring immediately before the braking operation is started, and
(iv) a speed change ratio present in a transmission of the vehicle immediately before the braking operation is started
the controller being configured to adjust the amount of change of the index a first amount of change of the index in response to the acceleration changing a first acceleration amount when the index is the first value and to adjust the amount of change of the index a second amount of change of the index in response to the acceleration changing the first acceleration amount when the index is the second value, the first amount of change of the index being different from the second amount of change of the index.

2. The control apparatus according to claim 1, wherein the change in acceleration is caused by the braking operation, and the controller is configured to restrain the amount of change of the index based on the pre-change index present immediately before the braking operation is started.

3. The control apparatus according to claim 2, wherein the controller is configured to restrain the amount of change of the index based on the accelerating operation performed by the driver immediately before the braking operation is started.

4. The control apparatus according to claim 3, wherein the accelerating operation includes at least one of an amount of depression of an accelerator pedal, an accelerator operation amount, a speed at which the accelerator pedal is released, and a switch-pedal time that is taken to switch from the accelerator pedal to a brake pedal.

5. The control apparatus according to claim 2, wherein the controller is configured to restrain the amount of change of the index based on the output rotation speed of the drive force source of the vehicle occurring immediately before the braking operation is started.

6. The control apparatus according to claim 2, wherein the controller is configured to restrain the amount of change of the index based on the speed change ratio present in the transmission of the vehicle immediately before the braking operation is started.

7. The control apparatus according to claim 1, wherein the controller is configured to set the index based on a resultant acceleration composed of a longitudinal acceleration component in a longitudinal direction of the vehicle and a lateral acceleration component in a direction of an axle shaft of the vehicle.

8. The control apparatus according to claim 7, wherein the controller is configured to set the index by causing a degree of change of the index based on the change of the longitudinal acceleration component in an accelerating direction to be greater than a degree of change of the index based on the change of the longitudinal acceleration component in a decelerating direction.

9. The control apparatus according to claim 7, wherein the controller is configured to set the index by causing a degree of change of the index that is based on the change of the longitudinal acceleration component to be greater than a degree of change of the index that is based on the change of the lateral acceleration component.

10. The control apparatus according to claim 1, wherein:
the index is an indicated sports index that reflects the acceleration of the vehicle, and
the controller is configured to
change the travel characteristic to a progressively sportier travel characteristic with an increase in the indicated sports index,
determine whether or not the driver wanted a sporty travel characteristic immediately before the acceleration changes, when the travel characteristic is to be changed, and
restrain or prohibit an increase of the indicated sports index if it is determined that the driver did not want the sporty travel characteristic.

11. The control apparatus according to claim 10, wherein:
the controller, when changing the travel characteristic, is configured to
determine whether or not the driver performed a driving operation for an emergency braking, and
restrain or prohibit the increase of the indicated sports index if it is determined that the driver performed the driving operation for the emergency braking and it is determined that the driver did not want the sporty travel characteristic.

12. The control apparatus according to claim 1, wherein the state of travel includes at least one of a driving operation amount, the acceleration in a longitudinal direction, the acceleration in a lateral direction, a resultant acceleration composed of the acceleration in the longitudinal direction and the acceleration in the lateral direction, a degree of yawing, and a yaw rate.

13. The control apparatus according to claim 12, wherein the driving operation amount includes at least one of an accelerator operation amount, a brake operation amount, and a steering wheel operation amount.

14. The control apparatus according to claim 1, wherein the travel characteristic includes at least one of a motive power characteristic of the vehicle, an acceleration characteristic of the vehicle, a braking characteristic of the vehicle, a turning-round characteristic of the vehicle, a turning performance of the vehicle, and a suspension characteristic of a vehicle body of the vehicle caused by a suspension mechanism.

* * * * *